(12) United States Patent
Guo et al.

(10) Patent No.: US 10,523,294 B2
(45) Date of Patent: Dec. 31, 2019

(54) METHOD AND APPARATUS FOR UE BEAMFORMING AND BEAM SWEEPING IN A WIRELESS COMMUNICATION SYSTEM

(71) Applicant: ASUSTeK COMPUTER INC., Taipei (TW)

(72) Inventors: Yu-Hsuan Guo, Taipei (TW); Richard Lee-Chee Kuo, Taipei (TW); Meng-Hui Ou, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 15/631,210

(22) Filed: Jun. 23, 2017

(65) Prior Publication Data

US 2017/0373740 A1   Dec. 28, 2017

Related U.S. Application Data

(60) Provisional application No. 62/354,284, filed on Jun. 24, 2016.

(51) Int. Cl.
| | |
|---|---|
| *H04B 7/06* | (2006.01) |
| *H04B 7/08* | (2006.01) |
| *H04L 5/00* | (2006.01) |

(52) U.S. Cl.
CPC ........... *H04B 7/0617* (2013.01); *H04B 7/066* (2013.01); *H04B 7/0632* (2013.01);
(Continued)

(58) Field of Classification Search
CPC ..... H04B 7/0617; H04B 7/0632; H04L 5/006; H04L 5/0028
See application file for complete search history.

(56) References Cited

U.S. PATENT DOCUMENTS

| | | |
|---|---|---|
| 2007/0286303 A1 | 12/2007 | Yamaura |
| 2010/0103045 A1 | 4/2010 | Liu et al. |

(Continued)

FOREIGN PATENT DOCUMENTS

| | | |
|---|---|---|
| CN | 104412638 A | 3/2015 |
| CN | 104620551 A | 5/2015 |

(Continued)

OTHER PUBLICATIONS

European Office Action and Extended Search Report for European Patent Application No. 17177581.0 dated Feb. 20, 2018, 14 pages.

(Continued)

*Primary Examiner* — Zhiren Qin
(74) *Attorney, Agent, or Firm* — Skaar Ulbrich Macari, P.A.

(57) ABSTRACT

A method for a wireless communications system is disclosed. In one example, a user equipment (UE) device (e.g. a mobile phone) provides a UE beam sweeping number to a network node. Based on the UE beam sweeping number, the network node provides configuration information or allocates a resource to the UE device. The UE device can use the configuration information or the resource for measurement. The beam sweeping number refers to the number of time intervals that the UE device would need to generate multiple sets of UE beams, one set per time interval, that would cover all possible directions in which the UE device sends and/or receives transmissions, in a manner that resembles a sweeping of UE beams.

20 Claims, 20 Drawing Sheets

(52) U.S. Cl.
CPC ......... *H04B 7/0634* (2013.01); *H04B 7/0639* (2013.01); *H04B 7/0695* (2013.01); *H04B 7/088* (2013.01); *H04L 5/006* (2013.01); *H04L 5/0007* (2013.01); *H04L 5/0028* (2013.01)

(56) References Cited

U.S. PATENT DOCUMENTS

| | | | |
|---|---|---|---|
| 2013/0045690 | A1 | 2/2013 | Seol et al. |
| 2013/0237218 | A1* | 9/2013 | Li .................. H04W 48/16 455/434 |
| 2013/0286960 | A1 | 10/2013 | Li et al. |
| 2013/0343303 | A1* | 12/2013 | Kim .................. H04B 7/0452 370/329 |
| 2015/0173004 | A1* | 6/2015 | Nigam .................. H04W 48/16 370/331 |
| 2015/0282122 | A1 | 10/2015 | Kim |
| 2016/0127919 | A1 | 5/2016 | Hui et al. |
| 2017/0222693 | A1* | 8/2017 | Shen .................. H04B 7/0408 |
| 2017/0251460 | A1* | 8/2017 | Agiwal .............. H04W 72/0406 |
| 2017/0331670 | A1* | 11/2017 | Parkvall ............ H04W 52/0274 |
| 2018/0262919 | A1 | 9/2018 | Peng et al. |

FOREIGN PATENT DOCUMENTS

| | | |
|---|---|---|
| CN | 105656533 A | 6/2016 |
| JP | 2012199680 A | 10/2012 |
| KR | 20130084340 A | 7/2013 |
| WO | 2013086164 A1 | 6/2013 |
| WO | 2014116090 A1 | 7/2014 |
| WO | 2014124164 A1 | 8/2014 |
| WO | 2016055003 A1 | 4/2016 |
| WO | 2016086144 A1 | 6/2016 |

OTHER PUBLICATIONS

"Beam Forming Impacts," 3GPP TSG-RAN WG2 Meeting #93bis, Apr. 2016, R2-162366, Nokia, Alcatel-Lucent Shanghai Bell, Dubrovnik, Croatia, 3 pages.

"Discussion on terminology of beamforming based high frequency NR," 3GPP TSG-RAN WG2 Meeting #94, May 2016, R2-163716, Samsung, Nanjing, China, 4 pages.

"Beam support in NR," 3GPP TSG RAN WG2 Meeting #93bis, Apr. 2016, R2-162709, Intel Corporation, Dubrovnik, Croatia, 4 pages.

"Active Mode Mobility in NR: SINR drops in higher frequencies," 3GPP TSG-RAN WG2 #93bis, Apr. 2016, R2-162762, Ericsson, Dubrovnik, Croatia, 4 pages.

"Radio Access Architecture and Interfaces," 3rd Generation Partnership Project, Technical Specification Group Radio Access Network, Study on New Radio Access Technology, 3GPP TR 38.801, Apr. 2106, V0.1.0, Release 14, 17 pages.

"Summary of email discussion [93bis#23][NR] Deployment scenarios," 3GPP TSG-RAN WG2 #94, May 2016, R2-164306, Revision of R2-163399, NTT Docomo, Inc., Nanjing, China, 18 pages.

"3GPP TDocs (written contributions) at meeting," Meeting: R2-94, May 2016, Nanjing, China, 38 pages. http://www.3gpp.org/DynaReport/TDocExMtg--R2-94-31668.htm.

"RAN2 Impacts in HF-NR," 3GPP TSG-RAN WG2 #94, May 2016, R2-163879, MediaTek Inc., Nanjing, China, 5 pages.

"Beam level management <-> Cell level mobility," 3GPP TSG-RAN WG2 Meeting #93bis, Apr. 2016, R2-162210, Samsung, Dubrovnik, Croatia, 4 pages.

"Cell concept in NR," 3GPP TSG RAN WG2 Meeting #94, May 2016, R2-163471, CATT, Nanjing, China, 4 pages.

"General considerations on LTE-NR tight interworking," 3GPP TSG-RAN WG2 Meeting #94, May 2016, R2-164270, Huawei, HiSilicon, Nanjing, China, 3 pages.

"RAN2 aspects of high frequency New RAT," 3GPP TSG-RAN WG2 Meeting #93bis, Apr. 2016, R2-162251, Samsung, Dubrovnik, Croatia, 8 pages.

"Discussion on Beam Measurement and Tracking for 5G New Radio Interface in mmWave Frequency Bands," 3GPP TSG RAN WG2 #93bis, Apr. 2016, R2-162226, Samsung, Dubrovnik, Croatia, 5 pages.

"Mobility Supporting for HF-NR," 3GPP TSG-RAN WG2 #94, May 2016, R2-163484, MediaTek Inc., Nanjing, China, 6 pages.

"Evolved Universal Terrestrial Radio Access (E-UTRA) and Evolved Universal Terrestrial Radio Access Network (E-UTRAN)," 3rd Generation Partnership Project, Technical Specification Group Radio Access Network, Overall description, 3GPP TS 36.300, Mar. 2016, V13.3.0, 295 pages.

"Radio Resource Control (RRC)—Protocol specification," 3rd Generation Partnership Project, Technical Specification Group Radio Access Network, Evolved Universal Terrestrial Radio Access (E-UTRA), 3GPP TS 36.331, Mar. 2016, V13.1.0, 177 pages.

"User Equipment (UE) procedures in idle mode," 3rd Generation Partnership Project, Technical Specification Group Radio Access Network, Evolved Universal Terrestrial Radio Access (E-UTRA), 3GPP TS 36.304, Mar. 2016, V13.1.0, 43 pages.

Ericsson, "SI: Study on Latency reduction techniques for LTE," 3GPP TSG RAN Meeting #67, Mar. 2015, RP-150465, Shanghai, China, 8 pages.

"Physical Layer Procedures," 3rd Generation Partnership Project, Technical Specification Group Radio Access Network, Evolved Universal Terrestrial Radio Access (E-UTRA), 3GPP TS 36.213, Mar. 2016, V13.1.1, 361 pages.

"Physical Channels and Modulation," 3rd Generation Partnership Project, Technical Specification Group Radio Access Network, Evolved Universal Terrestrial Radio Access (E-UTRA), 3GPP TS 36.211, Mar. 2016, V13.1.0, 155 pages.

"Multiplexing and Channel Coding," 3rd Generation Partnership Project, Technical Specification Group Radio Access Network, Evolved Universal Terrestrial Radio Access (E-UTRA), 3GPP TS 36.212, Mar. 2016, V13.1.0, 129 pages.

"DL Channel Design for Shortened TTI", 3GPP TSG RAN WG1 #84bis, Apr. 2016, R1-163068, Qualcomm Incorporated, Busan, Korea, 7 pages.

Japanese Office Action for Japanese Patent Application No. 2017-122945 dated Aug. 28, 2018, 7 pages (including English translation).

Taiwanese Office Action and Search Report for Taiwanese Patent Application No. 106121159 dated Oct. 3, 2018, 6 pages.

Korean Office Action for Korean Patent Application No. 10-2017-0079963 dated Nov. 5, 2018, 7 pages (including English translation).

"Framework for beamformed access," 3GPP TSG RAN WG1 #85, May 2016, R1-164013, Samsung, Nanjing, China, 4 pages.

European Office Action for European Patent Application No. 17177581.0 dated Nov. 7, 2017, 15 pages.

Korean Office Action dated May 3, 2019 for Korean Application No. 10-2017-0079963, 7 pages.

Nokia, Alcatel-Lucent Shanghai Bell, "Support for Beam Based Common Control Plane in 5G New Radio", 3GPP TSG-RAN WG1 #84bis R1-162895, Apr. 18, 2016, 4 pages.

Office Action to the corresponding Chinese Patent Application rendered by the China Intellectual Property Administration (CNIPA) dated Aug. 22, 2019, 13 pages.

Office Action to the corresponding European Patent Application rendered by the European Patent Office (EPO) dated Oct. 10, 2019, 5 pages.

Office Action to the corresponding Korean Patent Application rendered by the Korean Intellectual Property Office (KIPO) dated Oct. 15, 2019, 9 pages (including English translation).

* cited by examiner

Different deployment scenarios with Single TRP cell

METHOD AND APPARATUS FOR UE BEAMFORMING AND BEAM SWEEPING IN A WIRELESS COMMUNICATION SYSTEM

CROSS-REFERENCE TO RELATED APPLICATIONS

This application claims priority to U.S. Provisional Patent Application Ser. No. 62/354,284, filed on Jun. 24, 2016, and entitled METHOD AND APPARATUS FOR UE BEAMFORMING IN A WIRELESS COMMUNICATION SYSTEM, the entirety of which is hereby incorporated by reference.

TECHNICAL FIELD

The subject disclosure is directed to wireless communications, and is more particularly related to UE beamforming and beam sweeping by a user equipment (UE) (e.g. a mobile phone) operating in a cell (e.g. a 5G cell).

BACKGROUND

The 3rd Generation Partnership Project (3GPP) is a group that is trying to investigate and develop technology components for the next generation access technology, namely 5G. 3GPP commenced its standardization activities vis-a-vis the 5G in March of 2015. 3GPP regularly publishes its meeting notes that describe its proposals, reference architecture models and study items for 5G. For example, 3GPP envisions a single cell architecture that contains multiple TRPs (also referred to as distributed units (DUs)) and supports intra-cell mobility of the UE as it travels among the TRPs. This architecture presents numerous challenges to which the inventions disclosed herein provide solutions.

SUMMARY

The following presents a simplified summary of the specification to provide a basic understanding of some aspects of the specification. This summary is not an extensive overview of the specification. It is intended to neither identify key or critical elements of the specification nor delineate any scope particular to any embodiments of the specification, or any scope of the claims. Its sole purpose is to present some concepts of the specification in a simplified form as a prelude to the more detailed description that is presented later.

As used herein, the following terms can be referred to by the respective abbreviations: 3rd Generation Partnership Project (3GPP); 5th generation (5G); Beam Specific Reference Signal (BRS); Base Station (BS); Cloud RAN (C-RAN); Connected State (CONN); Channel State Information (CSI); Closed Subscriber Group (CSG); Central Unit (CU); Downlink (DL); Distributed Unit (DU); Evolved Node B (eNB or eNodeB); Evolved Universal Terrestrial Radio Access (E-UTRA); Frequency-Division Duplex (FDD); Global System for Mobile Communications (GSM); Long Term Evolution (LTE); Medium Access Control (MAC); Multicast-Broadcast Single-Frequency Network (MBSFN); Multiple Input, Multiple Output (MIMO); Network Function Virtualization (NFV); New RAT (NR); Network (NW); Physical (PHY); Public Land Mobile Network (PLMN); Radio Access Technology (RAT); Radio Frequency (RF); Radio Resource Control (RRC); Reference Signal Receiving Power (RSRP); Reference Signal Receiving Quality (RSRQ); Reception (Rx); Signal to Interference Plus Noise Ratio (SINR); Tracking Area (TA); Tracking Area Code (TAC); Tracking Area Identity (TAI); Transmission Reception Point (TRP); TRP Group (TRPG); Technical Specification (TS); Transmission (Tx); User Equipment (UE) (also referred to as UE device); and Universal Terrestrial Radio Access (UTRA).

In various non-limiting embodiments, by way of example, the disclosed subject matter provides a method for a user equipment (UE) device, in which the UE device provides information related to UE beamforming to a network node of a network. The information includes a UE beam sweeping number.

In a further non-limiting example, based on the UE beam sweeping number, the network node provides the UE device with configuration information.

In a further non-limiting example, based on the UE beam sweeping number, the network node provides the UE device with a resource allocation.

In a further non-limiting example, the UE device provides the information related to UE beamforming to the network node during a connection establishment procedure.

In a further non-limiting example the UE device provides the information related to UE beamforming to the network node during a random access procedure.

In a further non-limiting example, the configuration information or the resource allocation is provided for the UE device to perform measurement.

In a further non-limiting example, the configuration information or the resource allocation information is related to a reference signal, for example, a beam specific reference signal (BRS).

In a further non-limiting example, the UE beam sweeping involves the UE device generating a subset of beams in one time interval and changing from that subset to different subsets of generated beam(s) in other time interval(s), so as to cover all possible directions for transmission and/or reception.

In a further non-limiting example, the UE beam sweeping number is a necessary number of time interval(s) for the UE device to sweep beams in all possible directions once for transmission and/or reception.

In addition, further example implementations are directed to systems, devices and/or other articles of manufacture that facilitate efficient usage of UE beamforming.

These and other features of the disclosed subject matter are described in more detail below.

BRIEF DESCRIPTION OF THE DRAWINGS

The devices, components, systems, and methods of the disclosed subject matter are further described with reference to the accompanying drawings in which:

FIG. 11(*b*) illustrates an example of BRS transmissions in which the network is aware of the UE device's beam sweeping number;

DETAILED DESCRIPTION

The 5G technology aims to support the following three families of usage scenarios, and specifically to satisfy both urgent market needs and more long-term requirements set forth by the ITU-R IMT-2020: (i) eMBB (enhanced Mobile Broadband), (ii) mMTC (massive Machine Type Communications) and (iii) URLLC (Ultra-Reliable and Low Latency Communications). An objective of 3GPP's 5G study item on new radio access technology is to identify and develop technology components for new radio systems that can operate in any spectrum band ranging from low frequencies to at least 100 GHz. However, radio systems that try to support high carrier frequencies (e.g. up to 100 GHz) will encounter a number of challenges in the area of radio propagation. For example, with increasing carrier frequency, the path loss would also increase.

According to R2-162366 (3GPP TSG-RAN WG2 Meeting #93bis), in lower frequency bands (e.g. in current Long Term Evolution (LTE) bands <6 GHz), the required cell coverage is provided by forming a wide sector beam for transmitting downlink common channels. However, utilizing wide sector beam on higher frequencies (>>6 GHz) is problematic in that the cell coverage is reduced for the same antenna gain. Thus, in order to provide the required cell coverage on higher frequency bands, higher antenna gain is needed to compensate for the increased path loss. To increase the antenna gain over a wide sector beam, larger antenna arrays, where the number of antenna elements range from tens to hundreds, are used to form high gain beams. As a consequence, the high gain beams are formed narrower than a typical wide sector beam, and so multiple high gain beams are needed for transmitting downlink common channels to cover the required cell area. The number of concurrent high gain beams that an access point is able to form is limited by the cost and complexity of the utilized transceiver architecture. In practice, for higher frequencies, the number of concurrent high gain beams is much less than the total number of beams required to cover the cell area. In other words, the access point is able to cover only a portion of the cell area by using a subset of beams at any given time.

Figure 1:
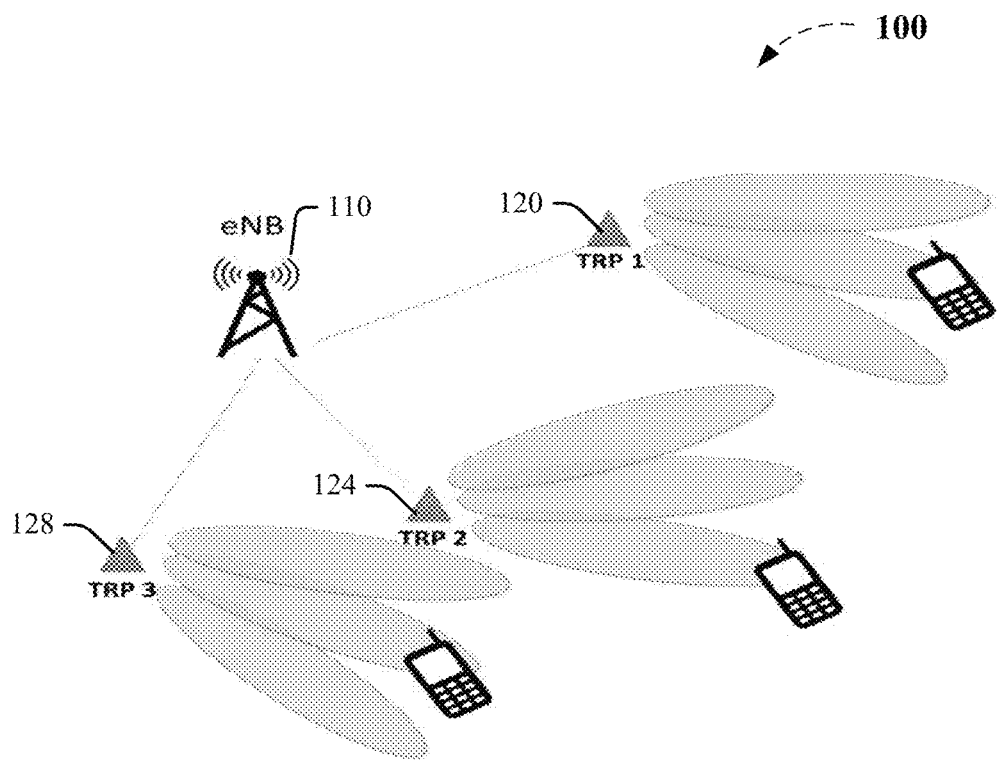
FIG. 1 illustrates the beam concept in 5G, where each TRP is generating multiple narrow beams, for example, as part of beam sweeping.

According to R2-163716 (3GPP TSG-RAN WG2 Meeting #94), beamforming is a signal processing technique used in antenna arrays for directional signal transmission/reception. In beamforming, a beam is be formed by combining elements in a phased array of antennas in such a way that signals at particular angles experience constructive interference while others experience destructive interference. Different beams are formed simultaneously using multiple arrays of antennas. According to R2-162709 (3GPP TSG RAN WG2 Meeting #93bis) and as shown in FIG. 1, the 5G cell 100 includes an evolved Node B (eNB) 110 communicably coupled to multiple transmission/reception points (TRPs) 120, 124 and 128, which can be either centralized or distributed. Each TRP 120, 124 or 128 can and is shown to form multiple beams. Serving beam for a UE device is a beam generated by a network, for example, by a TRP of the network, which is used to communicate with the UE device, for example, for transmission and/or reception. The number of beams formed by the TRP 120, 124 or 128 and the number of simultaneous beams in the time/frequency domain depend on the number of antenna array elements and the radio frequency RF being utilized by the TRP 120, 124 or 128.

Potential mobility types for the new radio access technology (NR) include intra-TRP mobility, inter-TRP mobility and inter-NR eNB mobility. According to R2-162762 (TSG RAN WG2 Meeting #93bis), the reliability of a system purely relying on beamforming and operating at higher frequencies is subject to challenges. A reason being that the coverage of such a system is more sensitive to both time and space variations. As a consequence, the signal to interference plus noise ratio (SINR) of its link (which is narrower than LTE) can drop much quicker than in the case of LTE.

In the 5G systems, fairly regular grid-of-beams coverage patterns with tens or hundreds of candidates for serving beams per node can be created, by using antenna arrays having hundreds of elements at access nodes. However, the coverage area of an individual serving beam from such an array would be small, down to the order of some tens of meters in width. As a consequence, channel quality degradation outside a currently-in-use serving beam's area would happen quicker than in the case of wide area coverage (e.g. as provided by LTE).

Figure 2:
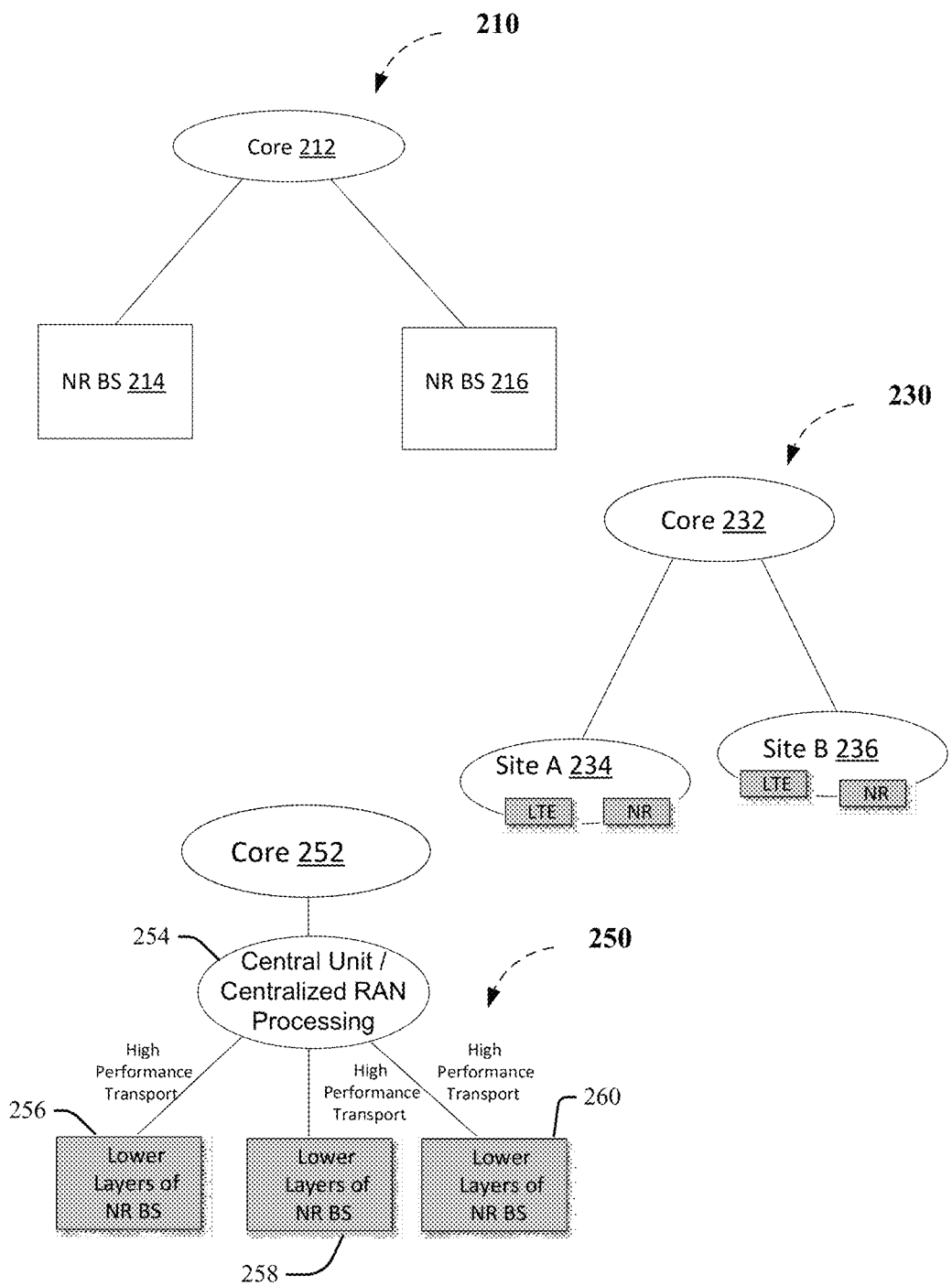
FIG. 2 illustrates exemplary radio network architectures that the 3GPP desires to support with NR including, for example, stand-alone, co-sited with LTE and centralized baseband architectures.
Figure 3:
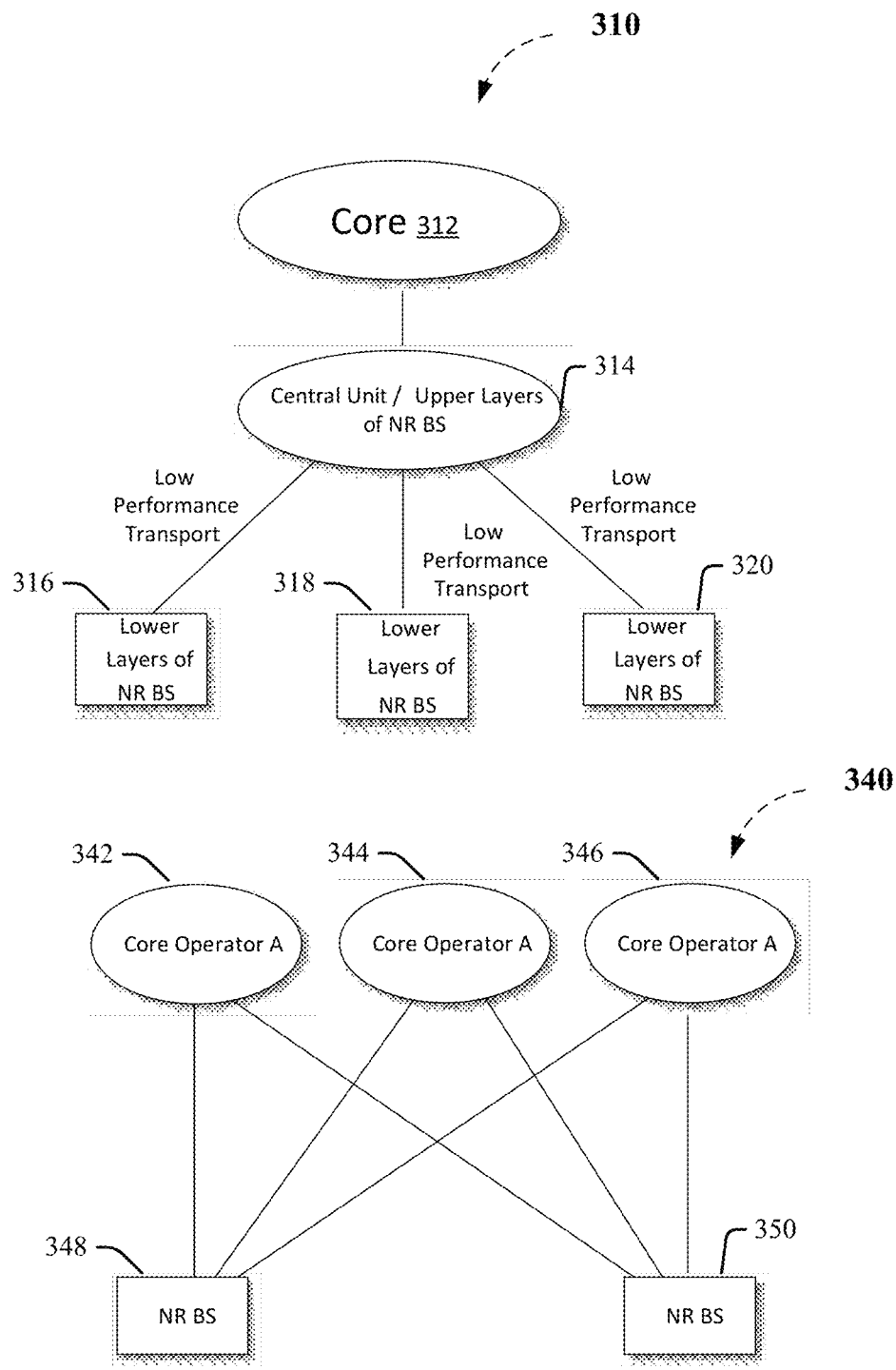
FIG. 3 illustrates more exemplary radio network architectures that the 3GPP desires to support with NR including, for example, centralized with low performance transport and shared RAN.

According to R3-160947 (3GPP TR 38.801 V0.1.0 (2016-04)), the scenarios illustrated in FIGS. 2 and 3 show exemplary radio network architectures that the 3GPP desires to support with the NR. FIG. 2 illustrates three example network architectures 210, 230 and 250. In the network architecture 210, the core network 212 is shown communicably coupled to two NR base stations 214 and 216.

In the network architecture 230, the core network 232 is communicably coupled to Sites A 234 and Site B 236, wherein those sites support both NR and LTE functionality. In network architecture 250, the core network 252 is communicably coupled to a central baseband unit 254, which serves as the central unit of the architecture 252 and performs centralized radio access network (RAN) processing. The central baseband unit 254, in turn, is communicably coupled to the lower layers of the NR base stations 256, 258 and 260 by way of high performance transport links.

FIG. 3 illustrates two more example radio network architectures 310 and 340 that the 3GPP desires to support with NR. In architecture 310, the core network 312 is communicably coupled to the central unit 314 that includes the upper layers of the NR base station. The central unit 314, in turn, is communicably coupled to the lower layers of the NR base stations 316, 318 and 320 via low performance transport links. In architecture 340, each core network operator 342, 344 and 346 is communicably coupled to both the NR base stations 348 and 350.

According to R2-164306 (3GPP TSG-RAN WG2 #94), the 3GPP desires to study the deployments of cell layouts for standalone NR in macro cells, heterogeneous cells and small cells. According to 3GPP TSG-RAN WG2 #94 meeting minutes for the May 23-26, 2016 meeting, one NR eNB corresponds to one or many TRPs. Typically, network controlled mobility involves two levels. In one level, the mobility control is driven by the RRC at the cell level. In the other level, there is zero or minimum involvement by the RRC (e.g. at MAC/PHY layers). According to R2-162210 (3GPP TSG-RAN WG2 Meeting #93bis), 3GPP desires to keep the principle of 2-level mobility handling in NR. One level would include cell level mobility and the other level would include beam level mobility management. Regarding cell level mobility, the cell selection or reselection occurs when the UE (or mobile device) is in IDLE state and the handover occurs when the UE or mobile device is in connected (CONN) state. The mobility control is driven by the RRC in the CONN state. Regarding beam level management, layer 1 (L1 or physical layer) handles appropriate selection of the TRP to be used by a UE (or a mobile device) and also handles the optimal beam direction.

5G systems are expected to rely heavily on "beam based mobility" to handle UE mobility, in addition to relying on the conventional handover based UE mobility. Technologies like MIMO, fronthauling, C-RAN and NFV will allow the coverage area controlled by a single 5G node to grow, thus increasing the possible applications for beam level management and reducing the need for cell level mobility. All mobility within the coverage area of one 5G node could be handled based on beam level management. In that scenario, handovers would only occur in case of UE mobility from the coverage area of one 5G node to the coverage area of another 5G node.

Figure 4:
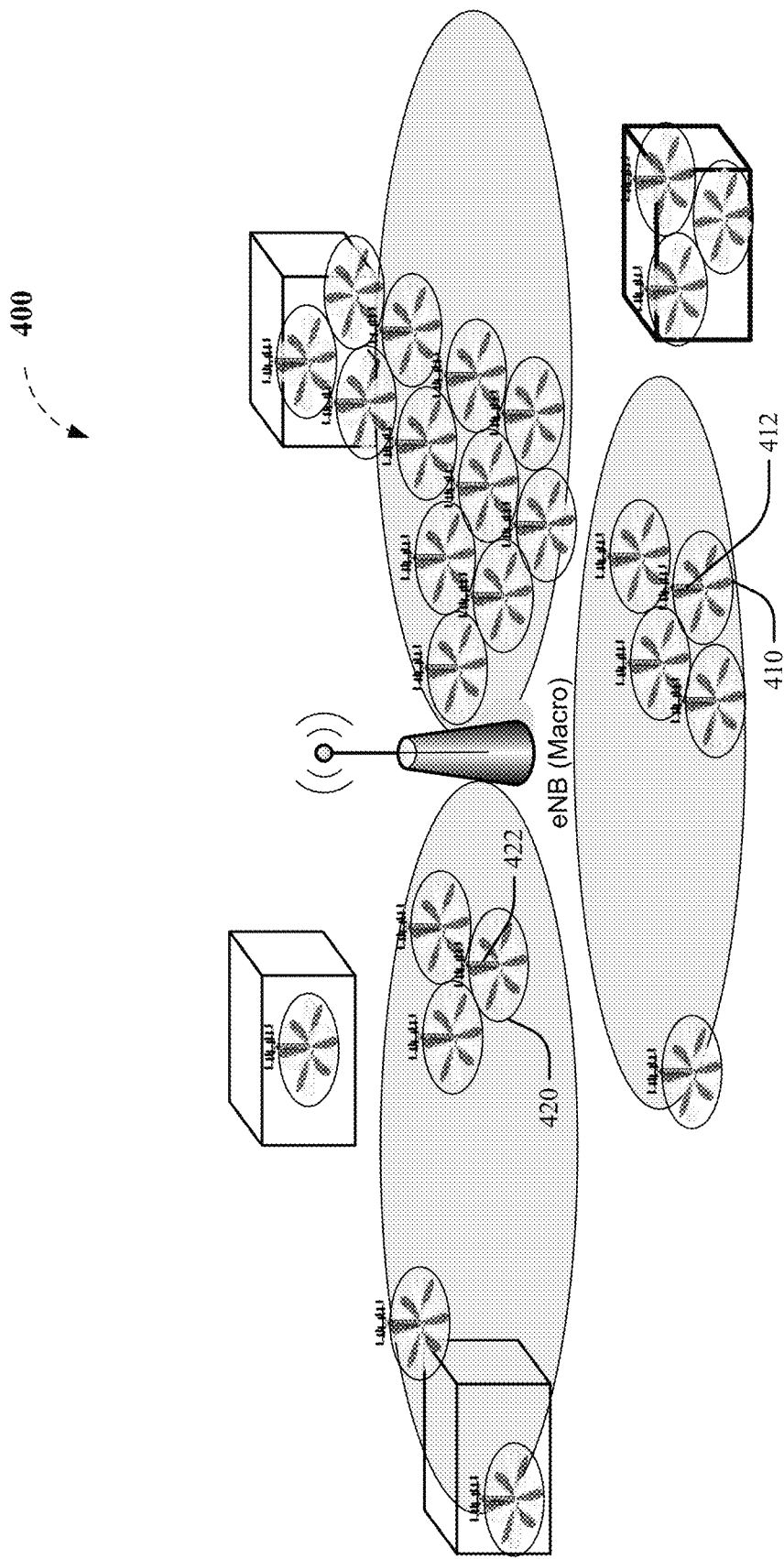
FIG. 4 illustrates various example deployment scenarios for arrangement of cells having single TRP.
Figure 5:
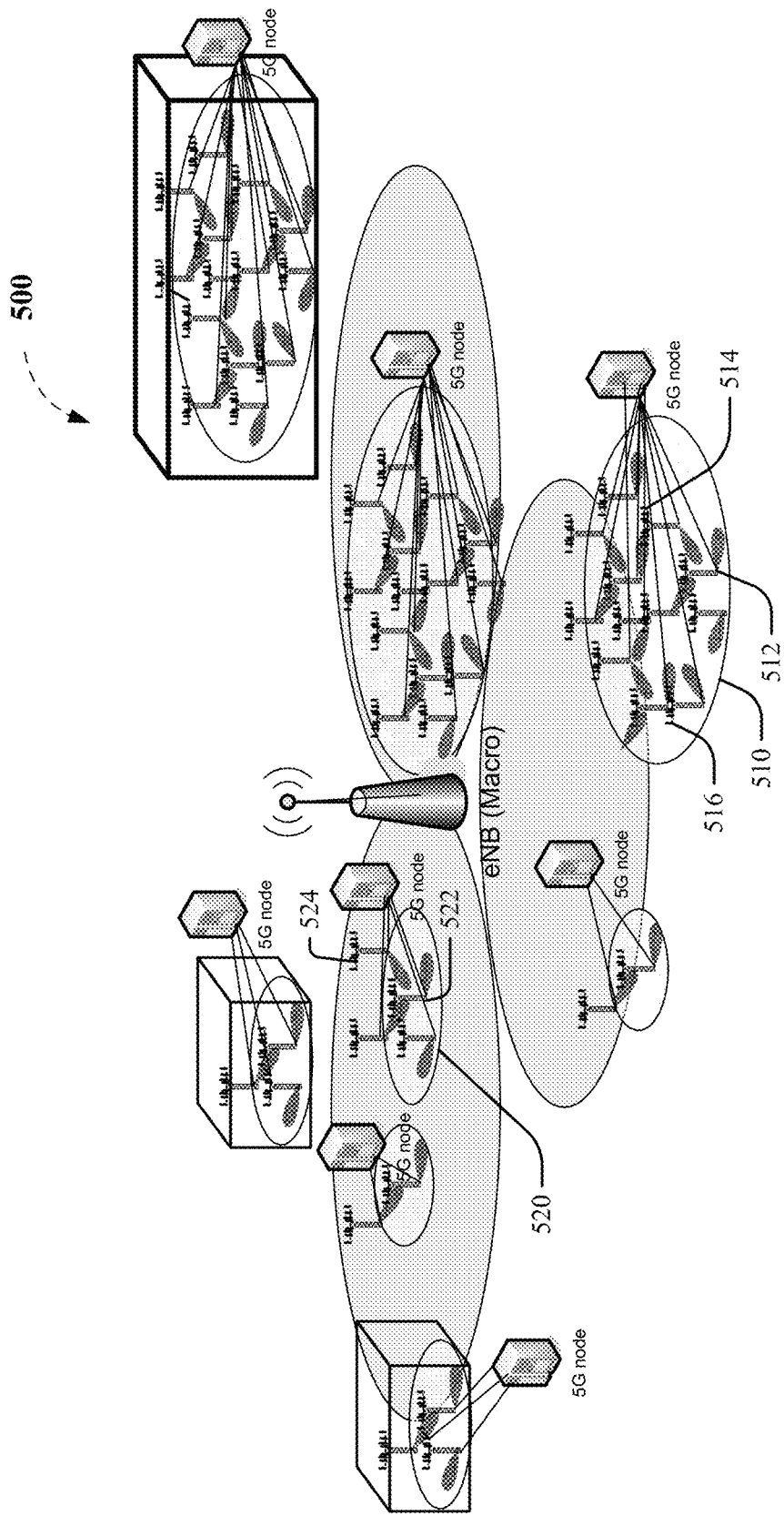
FIG. 5 illustrates various example deployment scenarios for arrangement of cells having multiple TRPs.
Figure 6:
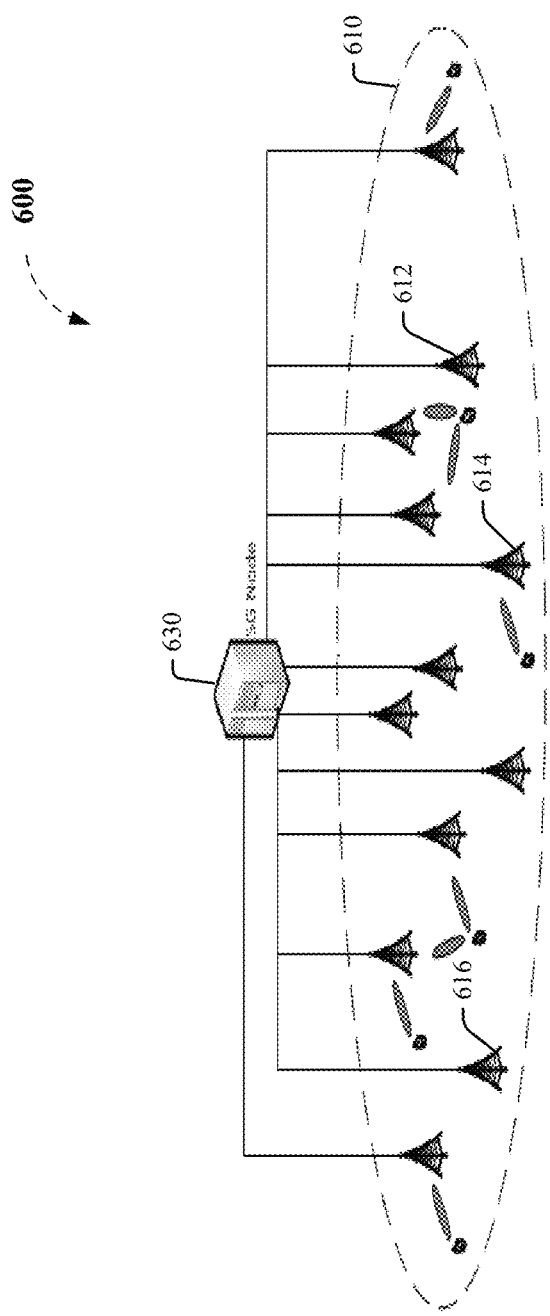
FIG. 6 illustrates an example 5G cell.
Figure 7:
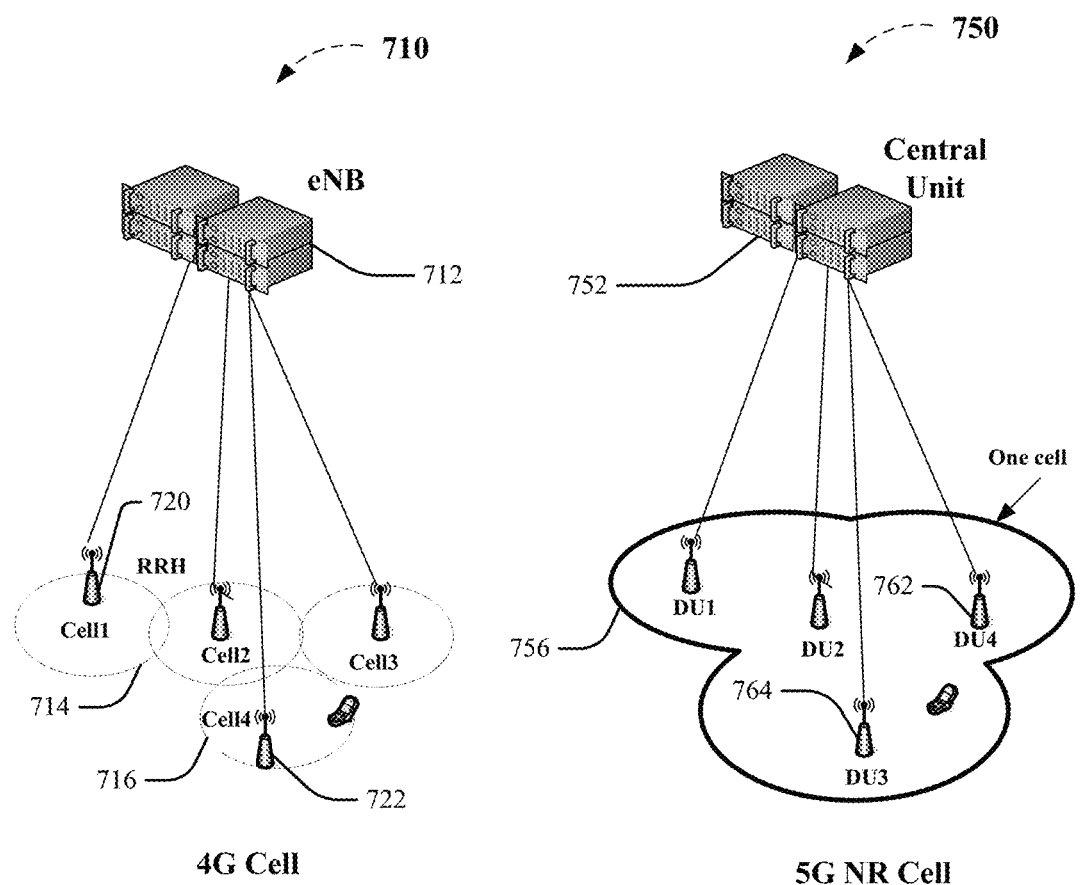
FIG. 7 illustrates side-by-side comparison between an example 4G cell and an example 5G cell.

FIGS. 4, 5, 6 and 7 show some examples of cell design in 5G NR. FIG. 4 shows an example deployment with a single-TRP cell. The deployment 400 includes numerous cells having a single TRP, for example cell 410 includes TRP 412 and cell 420 includes TRP 422. Some cells are clustered together and others are isolated. FIG. 5 shows an example deployment with multiple-TRP cells. The deployment 500 includes a cell 510 having multiple TRPs 512, 514 and 516. The deployment 500 also includes a cell 520 having TRPs 522 and 524. FIG. 6 shows an example deployment 600 having one 5G cell 610 comprising a 5G node 630 and multiple TRPs 612, 614 and 616. FIG. 7 shows a comparison between a LTE cell 710 and a 5G NR cell 750. The LTE cell 710 includes an eNB 712 communicably coupled to multiple cells 714 and 716. Cell 714 is shown to include TRP 720 and cell 716 is shown to include TRP 722. The NR cell 750 includes a centralized unit 752 communicably coupled to a single-cell 756. The single-cell 756 includes multiple distributed units (DU) 762 and 764. It will be understood that apart from performing a handover based on Radio Research Management (RRM) measurement, 3GPP desires that a 5G UE should be able to adapt the serving beam to maintain 5G connectivity even in case of beam quality fluctuation and/or UE intra-cell mobility. However, in order to do that, 5G Node-B and UE must be able to track and change the serving beam properly (referred to as beam tracking hereafter).

Some terminology and assumption are specified in the following and may be used hereafter. The term base station (BS), as used in the subject disclosure, refers to a network central unit in the NR that is used to control one or multiple TRPs associated with one or multiple cells. Communication between BS and TRP(s) can occur via a fronthaul connection. A BS could also be referred to as central unit (CU), eNB, or NodeB. A TRP, as used herein, is a transmission and reception point that provides network coverage and directly communicates with UEs. A TRP could also be referred to as a distributed unit (DU). A cell, as used herein, is composed of one or multiple associated TRPs, i.e. the coverage of the cell is a superset of the coverage of all the individual TRP(s) associated with the cell. One cell is controlled by one BS. A cell can also be referred to as a TRP group (TRPG). Beam sweeping is used to cover all possible directions for transmission and/or reception. For beam sweeping, numerous beams are required. As it is not possible to generate all these beams concurrently, beam sweeping means generation of a subset of these beams in one time interval and generation of different subsets of beam(s) in other time interval(s). Stated differently, beam sweeping means changing beams in time domain, such that all possible directions are covered after several time intervals. Beam sweeping number refers to the necessary number of time interval(s) needed to sweep beams in all possible directions once for transmission and/or reception. The control/instruction signaling related to beam sweeping would include a "beam sweeping number". The beam sweeping number indicates the number of times during a predetermined time period that various different subsets of beams must be generated to cover the desired area.

On the network side, a NR using beamforming could be standalone, meaning that the UE can directly camp on or connect to NR. Also, a NR using beamforming and a NR not using beamforming can coexist, for example, in different cells. A TRP can apply beamforming to both data and control signaling transmissions and receptions, if possible and beneficial. The number of beams generated concurrently by a TRP depends on the TRP's capability. For example, the maximum number of beams generated concurrently by different TRPs in the same cell may be the same and those in different cells may be different. Beam sweeping is necessary, e.g. for the control signaling to be provided in every direction. In various embodiments, downlink timing of TRPs in the same cell are synchronized and the RRC layer of the network side is located in the BS. The TRP should support both UEs with UE beamforming and UEs without UE beamforming, meaning that the TRP should support UEs of different capabilities and support UE designs based on different UE releases.

On the UE side, a UE may perform beamforming for reception and/or transmission, if possible and beneficial. The number of beams generated concurrently by a UE would depend on the UE's capability, for example, depending on whether generating more than one beam is possible for the UE. Beam(s) generated by a UE are typically wider than beam(s) generated by a eNB. Beam sweeping for transmission and/or reception is generally not necessary for user data but could be necessary for other signaling, for example, to perform a measurement. It is to be appreciated that not every UE supports UE beamforming, for example, due to UE capability or because UE beamforming was not supported by NR's first few release(s). One UE can to be served by multiple beams from one or multiple TRPs of the same cell. Same or different DL data could be transmitted on the same radio resource via different serving beams for diversity or throughput gain. There are at least two UE (RRC) states: connected state (or called active state) and non-connected state (or called inactive state or idle state).

According to an aspect of the subject disclosure, after a UE device powers on, it needs to find a cell to camp on. After camping on a cell, the UE device can initiate the establishment of a connection between itself and the network, for registration and/or data transmission purposes. In another embodiment, network requests the UE device, via paging, to initiate the connection establishment with the network. In this embodiment, the network may request the UE device to establish the connection because, for example, the network wants to transmit DL data to the UE device.

Figure 10:
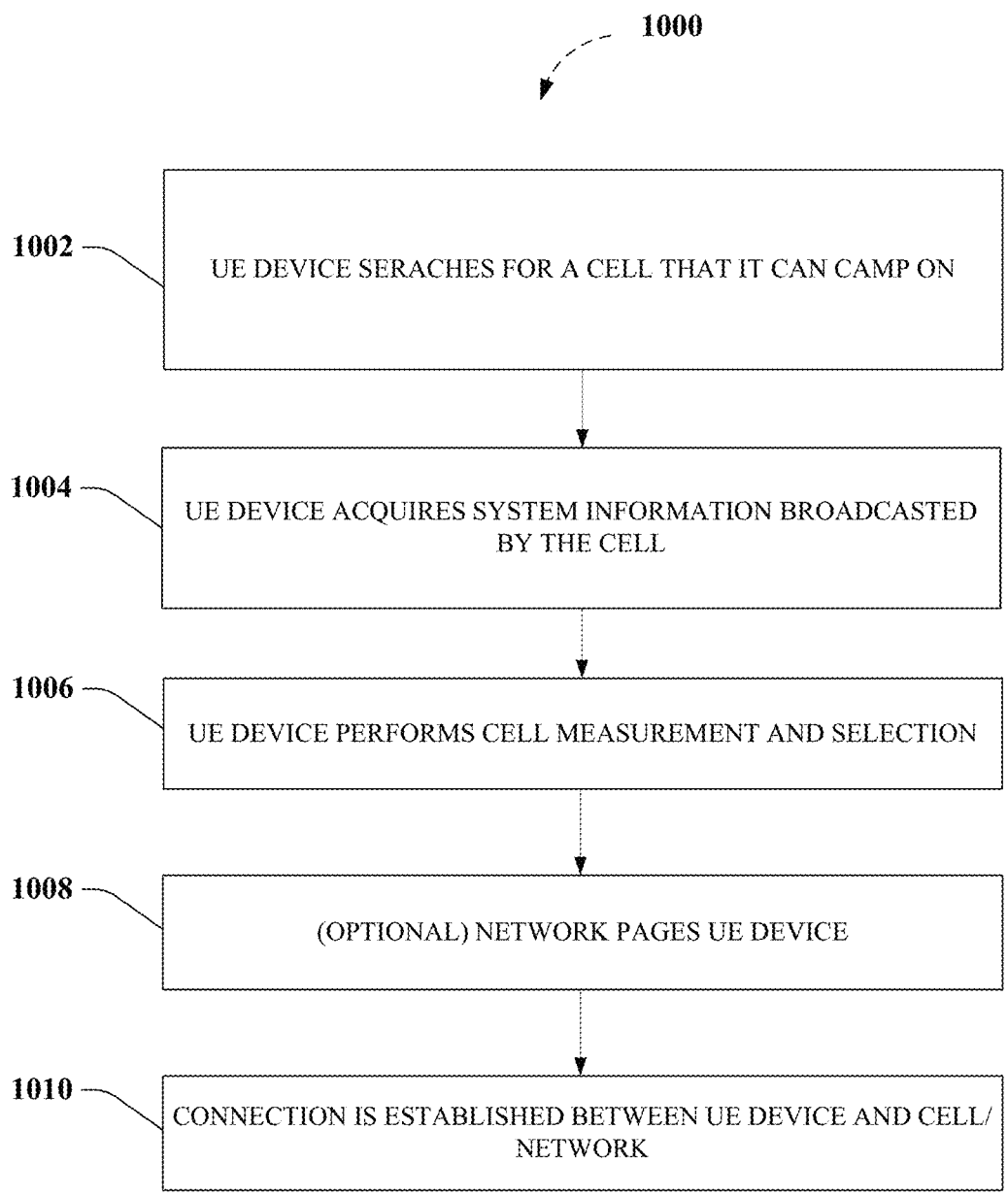
FIG. 10 illustrates an example methodology used by a UE device to make an initial access to a network.
Figure 14:
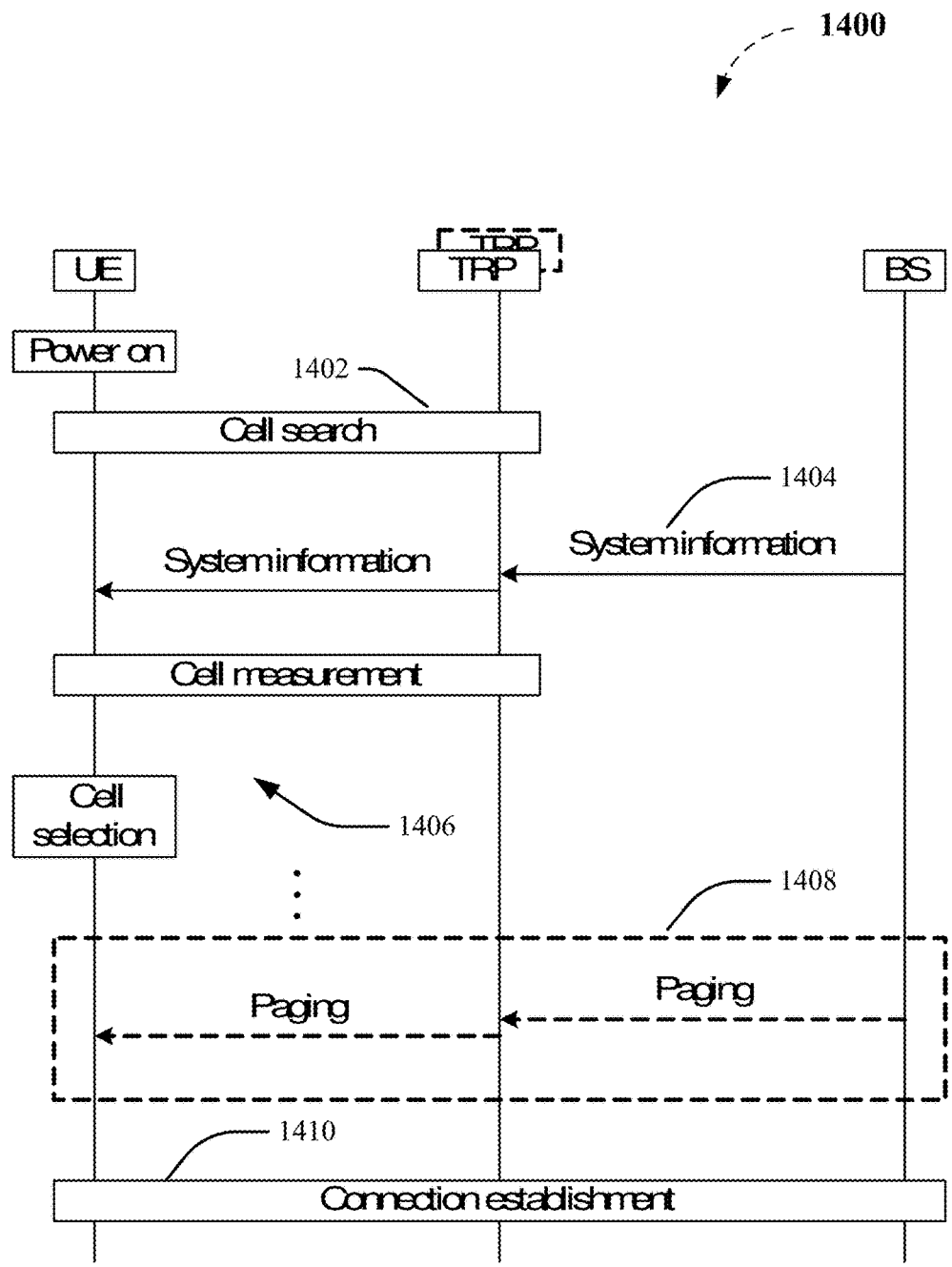
FIG. 14 illustrates an example methodology used by a UE device to make an initial access to a network.

FIG. 10 and FIG. 14 illustrates example methodologies by which a UE device makes/attempts an initial access to the network. Referring to FIG. 10, at Step 1002 of the flow diagram 1000, the UE device searches for a cell that it can camp on. This step can happen when, for example, the UE device powers on. To find a cell to camp on, the UE device can scan possible carrier frequencies. A cell provides signaling for the UE devices to identify the cell, for example, synchronization signaling. The cell can provide the signaling by beam sweeping. Different TRPs of the same cell can provide the same type of signaling during the same time interval(s). At Step 1004, the UE device performs acquisition of system information broadcasted by the cell. Specifically, the UE device acquires necessary parameters, e.g. related to cell selection, from the broadcasted system information. The broadcasted system information could be provided by the cell by beam sweeping. The system information can be provided by the BS of the cell to the TRP(s). The TRP(s), in turn, can broadcast the system information to the UE device.

At Step 1006, the UE device performs cell measurement and selection. Specifically, after the UE finds a cell which is possible to camp on, the UE measures the radio condition of the cell and determines whether to camp on the cell based on the measured result. The cell provides the signaling, for example, reference signaling, for the measurement, by beam sweeping. Different TRPs of the same cell can simultaneously provide the signaling during the same time interval(s). At Step 1008, the network pages the UE device. This is an optional step and the paging may be initiated when the network wants to transmit UE specific signaling/data to the UE and the UE is in a non-connected state. When the UE receives the paging, the UE initiates the connection establishment with the network to enter the connected state and could further receive the UE specific signaling/data from the network. The cell performs paging by beam sweeping. The paging can be performed by the TRP(s) upon receiving instructions from the BS.

At Step 1010, the connection is established between the UE device and the network. Specifically, the UE establishes connection with the BS via connection establishment procedure. In one embodiment, during the establishment procedure, the UE device performs a random access procedure to inform the network to be aware of the presence of the UE device. Random access procedure is used by UE devices to initiate a data transfer. The UEs obtain uplink timing information from the initial handshake (or preamble). In turn, the network provides resources for a UL transmission to UE device. After the connection is established, the UE device enters into the connected state.

FIG. 14 illustrates a similar methodology to FIG. 10, and illustrates the relationship between the TRP(s) and the BS on the network side. At Step 1402 of the flow diagram 1400, the UE device interacts with the TRP(s) and searches for a cell that it can camp on. This step can happen when, for example, the UE device powers on. To find a cell to camp on, the UE device can scan possible carrier frequencies. A cell provides signaling for the UE devices to identify the cell, for example, synchronization signaling. The cell can provide the signaling by beam sweeping. Different TRPs of the same cell can provide the same type of signaling during the same time interval(s). At Step 1404, the UE device performs acquisition of system information broadcasted by the cell. Specifically, the UE device acquires necessary parameters, e.g. related to cell selection, from the broadcasted system information. The broadcasted system information can be provided by the cell by beam sweeping. The system information can be provided by the BS of the cell to the TRP(s). The TRP(s), in turn, can broadcast the system information to the UE device.

At Step 1406, the UE device performs cell measurement by its interaction(s) with the TRP(s) and then performs cell selection. Specifically, after the UE finds a cell which is possible to camp on, the UE measures the radio condition of the cell and determines whether to camp on the cell based on the measured result. The cell provides the signaling, for example, reference signaling, for the measurement, by beam sweeping. Different TRPs of the same cell can simultaneously provide the signaling during the same time interval(s). At Step 1408, the network pages the UE device. This is an optional step and the paging may be initiated when the network wants to transmit UE specific signaling/data to the UE and the UE is in a non-connected state. When the UE receives the paging, the UE initiates the connection establishment with the network to enter the connected state and can further receive the UE specific signaling/data from the network. The cell performs paging by beam sweeping. The paging can be performed by the TRP(s) upon receiving instructions from the BS.

At Step 1410, the connection is established between the UE device and the network. Specifically, the UE establishes connection with the BS via connection establishment procedure. In one embodiment, during the establishment procedure, the UE device performs a random access procedure to inform the network to be aware of the presence of the UE device. Random access procedure is used by UE devices to initiate a data transfer. The UEs obtain uplink timing information from the initial handshake (or preamble). In turn, the network provides resources for a UL transmission to UE device. After the connection is established, the UE device enters into the connected state.

According to an aspect of the subject disclosure, after the UE camps on a cell, the UE can move among different beams or different TRPs of the cell when the UE is in a non-connected state (or idle mode). Or, the UE can leave the coverage of the cell and move to the coverage of a different cell. The mobility of the UE in a non-connected state can cause a UE beam change, a serving beam change or a cell reselection. If UE beamforming is used, the UE beam change can happen due to, for example, the UE device's rotation. This can happen when the UE is in a non-connected state. In this scenario, the UE may need to keep performing beam sweeping to avoid missing/ignoring of any signals due to UE beam changing.

Regarding the serving beam change, the serving beam change or the serving TRP change can occur among serving beams or TRPs of the same cell. With respect to the cell that the UE has camped on, the UE is served by TRP(s) whose signaling can be received by the UE. Serving beam(s) of serving TRP(s) can change due to UE mobility. Serving TRP(s) can also change when the UE moves within the cell that it is camped on. In this scenario, the UE may need to keep monitoring necessary signaling during all possible time intervals for different beams of the serving TRP(s) that are providing the necessary signaling for UE in non-connected state, to avoid missing any signaling from the network.

Regarding cell reselection, the UE typically continuously or semi-continuously performs measurements on the serving cell on which the UE is camping on and continuously or semi-continuously performs measurements on its neighboring cells, and evaluates whether to reselect the serving cell. The evaluation can include an evaluation of various attributes, characteristics, strengths and qualities of a cell. The UE can acquire system information of a neighbor cell and reselect the neighbor cell as the new serving cell if the UE determines that the neighbor cell is more optimal. To perform this task, the UE device requires parameters for evaluation of the cells from the network.

Figure 8:
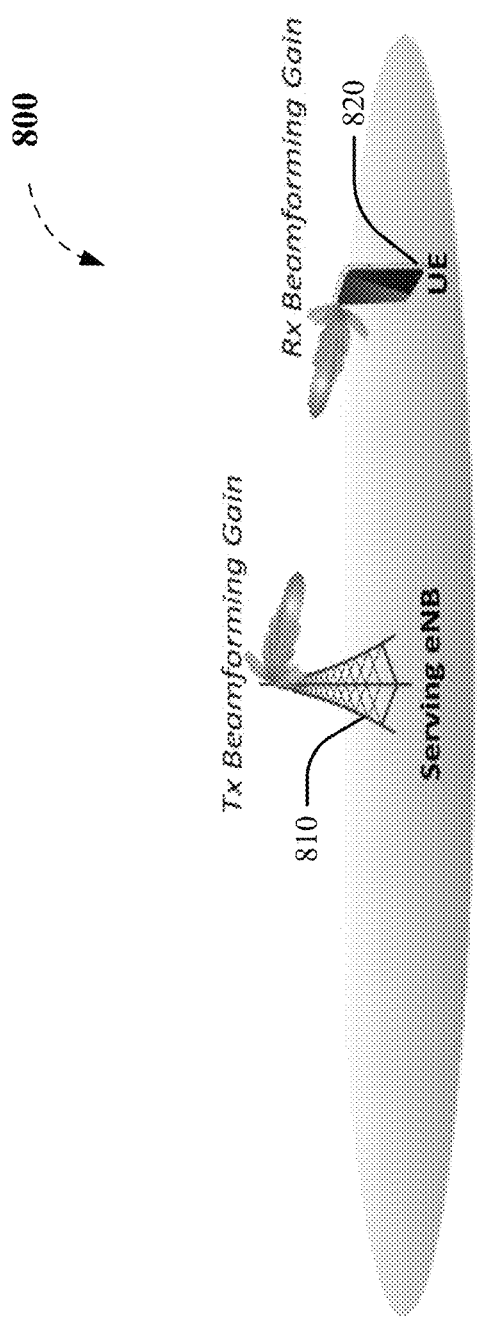
FIG. 8 illustrates an example high frequency HF-NR system that facilitates gain compensation by beamforming.

According to R2-162251 (3GPP TSG-RAN WG2 Meeting #92bis), beamforming can be performed on both eNB and UE sides. FIG. 8 illustrates the concept of gain compensation by beamforming in a high frequency (HF) NR system. In the example cell 800, beamforming is performed by both the eNB 810 and the UE 820. In one practical example, 3GGP expects the beamforming antenna gain at the eNB 810 to be about 15 to 30 dBi and the expected beamforming antenna gain at the UE 820 to be about 3 to 20 dBi.

Figure 9:
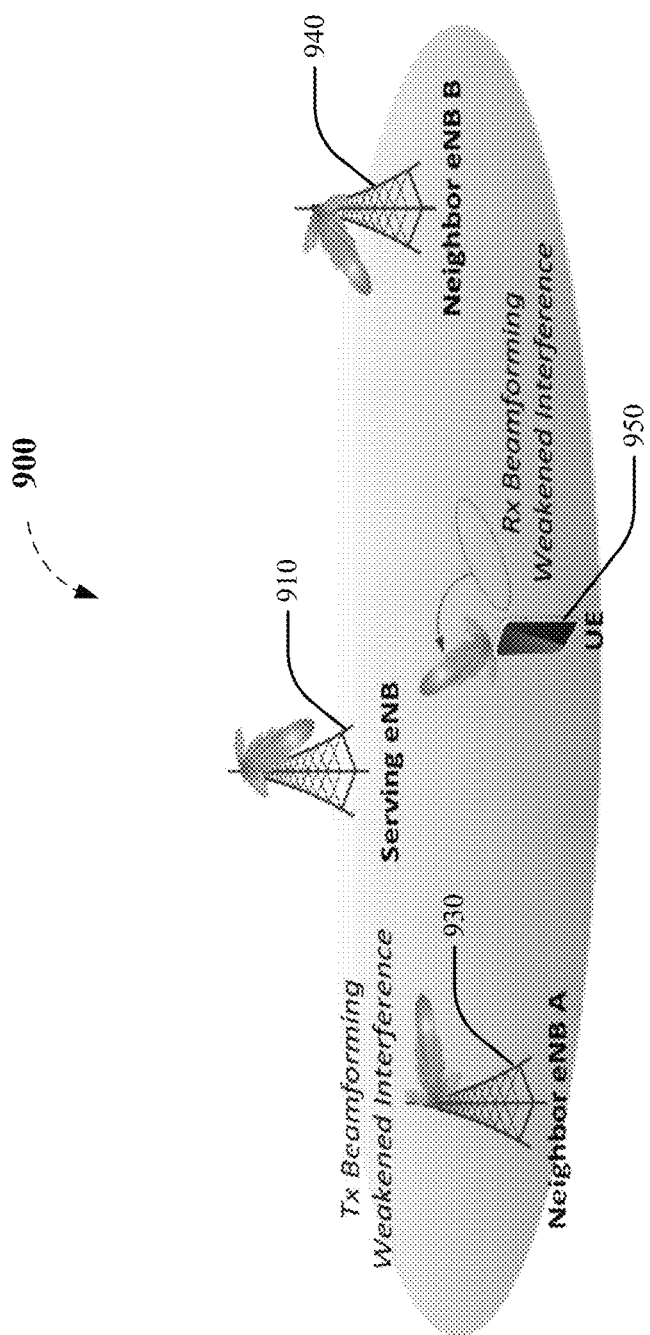
FIG. 9 illustrates an example HF-NR system that facilitates weakened interference by beamforming.

From SINR perspective, FIG. 9 illustrates a cell 900 in which interference is weakened because of beamforming. Sharp beamforming reduces interference power at the serving eNB 910 from neighboring interferers eNB A 930 and eNB B 940, for example, during a downlink operation. Interference power from UEs connected to neighboring eNBs 930, 940 is also reduced because of beamforming. It is to be understood and appreciated that in a TX beamforming case, effective interference will be caused only by other TXs whose current beam(s) are also pointed in the direction of the RX. Effective interference means that the interference power is higher than the effective noise power. In a RX beamforming case, effective interference will be caused only by other TXs whose beam(s) are pointed in the same direction as the UE's 950 current RX beam direction.

When a UE enters a connected state, UE beamforming and/or UE beam sweeping can have impact on various aspects and particularly the interactions that occur between the UE device and the network, for example, on operations such as random access procedure, radio resource allocation/ reservation, scheduling, measurement, and the like. By way of example, a DL reference signal, such as BRS, is used for beam tracking. Specifically, a UE device may determine/ select the qualified DL beam(s) and/or UL beam(s) via monitoring the DL reference signals transmitted by a network on different beams at different timings/time intervals. The network and the UE device must expend resources and power to generate and monitor the DL reference signals, and it is thus beneficial that the UE device and the network are synchronized and efficient about the monitoring and generating of reference signals, and avoid needless expending of resources and power.

Figure 11A:
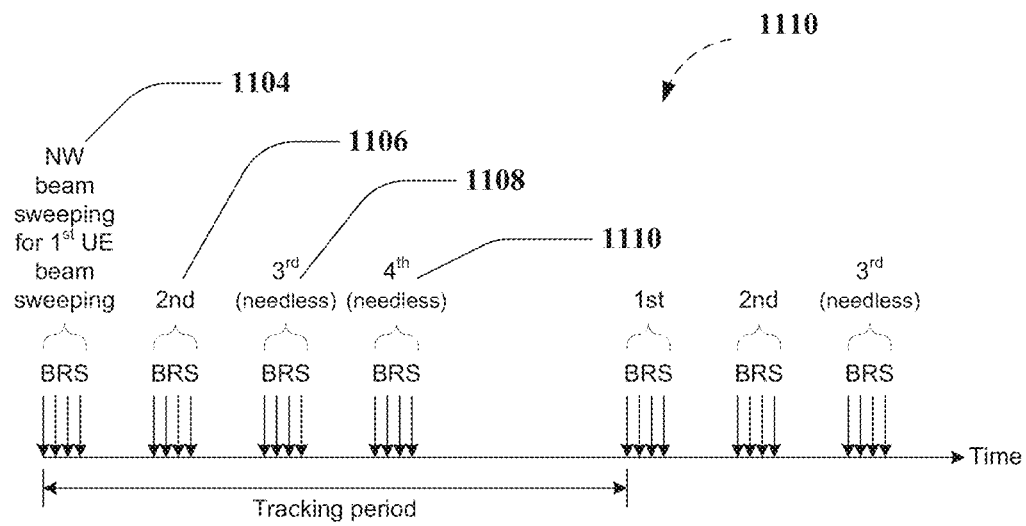
FIG. 11(*a*) illustrates an example of BRS transmissions in which the network is agnostic to the UE device's beam sweeping number.
Figure 11B:
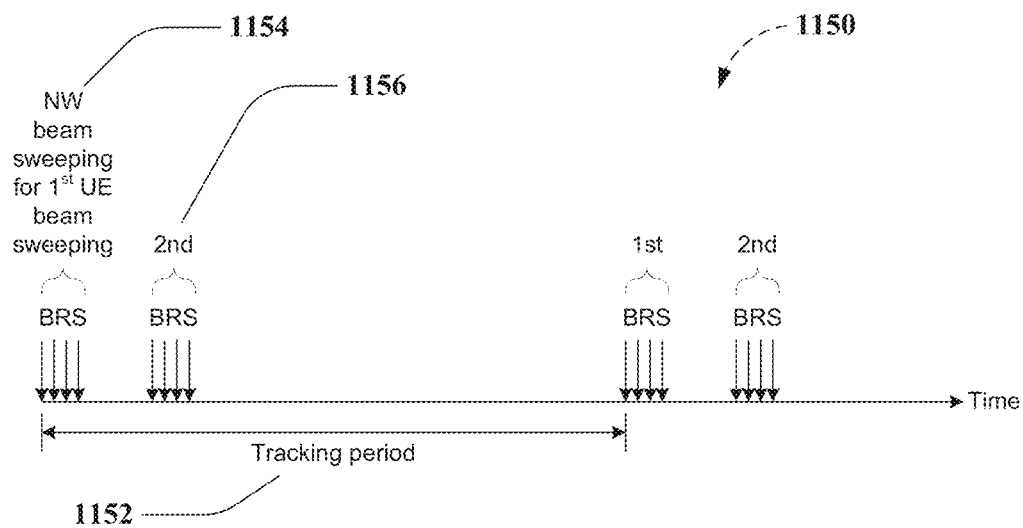

FIGS. 11(a) and 11(b) show two examples of transmissions of BRS signals. Referring to FIG. 11(a), a scenario 1110 is shown in which the network generates four bursts (1104, 1106, 1108 and 1110) of the BRS signals during the tracking period 1102. In this scenario 1110, the BRS signal is agnostic to the UE beam's beam sweeping number, which happens to be 2 in this example. Meaning that the UE's beam sweeping number of 2 is not known to the network. In such an example scenario 1110, the network typically operates on an assumed value, or a default value, about the UE device's beam sweeping number. In the scenario 1110, the network has assumed that the UE's beam sweeping number is 4. Operating on this assumption results in unnecessary signaling overhead and resource inefficiency. As shown in FIG. 11(a), the bursts of BRS signals 1108 and 1110 are needlessly generated because the UE device, which has a beam sweeping number of 2, is either ignoring the 3rd and 4th burst of BRS signals 1108 and 1110 or over monitoring by detecting them twice. The reason that the networks prefer to err on the side of overestimating the beam sweeping number, and thus over generating the BRS transmissions, is to ensure the BRS signals are not missed by the UE device.

FIG. 11(b) illustrates the scenario in which the UE device's beam sweeping number is known to the network. In the scenario 1150, the network generates two bursts of the BRS signals 1154 and 1156, during the tracking period 1152. The scenario 1150 provides for an efficient allocation of resources and power because the burst of the BRS signal is generated for exactly the same number of times as the UE's beam sweeping number, which is 2 in this example.

If the actual UE beam sweeping number, e.g. 2, is known to the network, efficiency of providing UE specific signaling, e.g. BRS, can be improved. Thus, it is beneficial that the UE provide UE beamforming related information to the network. So that the network, in turn, can allocate proper DL reference signal resources for the UE. The UE can use these resources to identify the qualified DL beam(s) and/or UL beam(s). Similarly, it is also beneficial if the network allocates proper UL reference signal resources to the UE. By doing so, the network can determine the qualified DL beam(s) and/or UL beam(s) via monitoring the UL reference signals transmitted by the UE. Also, it is beneficial if the network can obtain the UE's beamforming related information as early as possible, for example, when the connection is being established.

UE beamforming related information can include whether the UE tends to use, is using, or is able to use UE beamforming, whether the UE beam sweeping is required by the UE, the maximum number of beams the UE can generate concurrently, the UE beam sweeping number, the total number of UE beams/(sub)sets of beams that are needed to cover (all the) different directions, and the like. In an example implementation, the above information can be indicated to the network by way of signaling that provides information about the UE's capability. In another example implementation, all or part of the above information can be explicitly or implicitly indicated during a procedure for entering connected state by the UE. For example, the procedure can be a random access procedure or a connection establishment procedure. All or part of the information can be explicitly or implicitly indicated by the preamble (e.g. similar to Msg1 in LTE) of the random access procedure or the first UL transmission which carries UE data and/or control information (e.g. similar to Msg3 in LTE) of the random access procedure. The preamble sequence selected by the UE or the resource used by the UE to transmit a preamble can be used to indicate the UE beamforming related information.

Regarding a UE device that has the capability and need to perform UE beamforming in a cell, the UE can use UE beamforming to transmit the signals in a random access procedure, e.g. the preamble. If the UE performs UE beamforming in a cell, the UE can use UE beamforming to receive one or multiple of the following signals including a synchronization signal, a reference signal, a discovery signal, a system information, and a paging signal. A UE that uses UE beamforming may require beam sweeping to receive the above signal(s). A UE that uses UE beamforming or beam sweeping may need to monitor the above signal(s) in more time intervals than that is monitored by the UE not using UE beamforming or beam sweeping.

Synchronization signals are transmitted via the downlink to facilitate cell search. The synchronization signals can comprise primary synchronization signals and secondary synchronization signals. Reference signals are transmitted via the downlink to deliver reference points for downlink power, e.g. for use or estimation. Reference signals can comprise cell-specific reference signals, MBSFN reference signals, UE-specific reference signals, positioning reference signals, CSI reference signals, and/or discovery signals.

A UE can assume presence of the discovery signals consisting of cell-specific reference signals, primary and secondary synchronization signals, and configurable CSI reference signals. The network can include one or more of the following components including a central unit (CU), a distributed unit (DU), a transmission/reception point (TRP), a base station (BS), and a 5G node.

Figure 12:
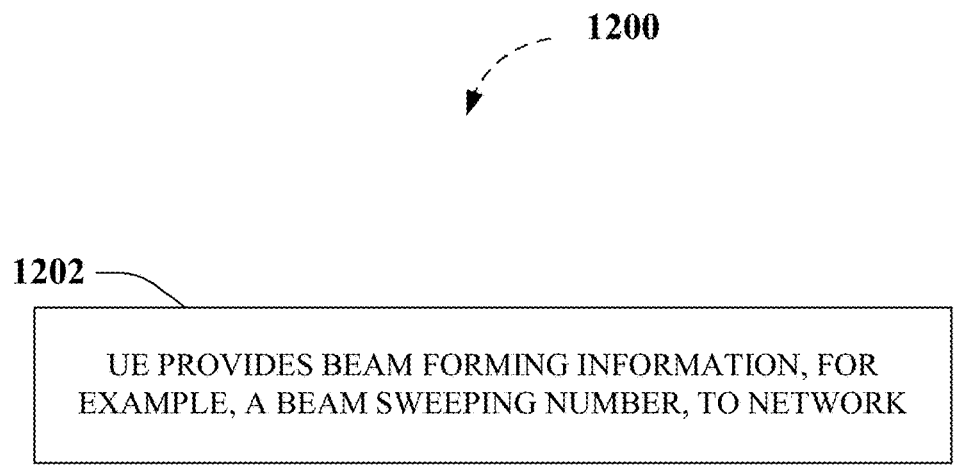
FIG. 12 illustrates an example methodology for providing information related to UE beamforming from a UE device to a network.

FIG. 12 illustrates an example methodology for providing information related to UE beamforming from a UE device to a network. At Step 1202 of the flow diagram 1200, the UE device provides information related to UE beamforming to a network node, for example, information comprising the UE beam sweeping number. In one embodiment, the information is provided during the connection establishment procedure between the UE device and the network. In another embodiment, the information is provided during the random access procedure.

The UE device would perform beam sweeping based on the beam sweeping number. For example, if the beam sweeping number is 2, the UE device will generate two sets of beams. These two sets of beams will be generated in two separate time intervals, back to back. The back to back generation of the two sets of beams will resemble a sweep that will cover all possible directions from which the UE device expects to receive or send transmissions. In another example, if the beam sweeping number is 4, the UE device will generate four sets of beams in four back to back time intervals. In one embodiment, a following time interval occurs immediately upon the completion of the preceding time interval. In another embodiment, there is a time gap between two time intervals of beam sweeping. The beam sweeping number is determined by the number of the UE beams the particular UE device is capable of generating. The UE devices may continuously or semi-continuously repeats the beam sweeping.

Figure 13:
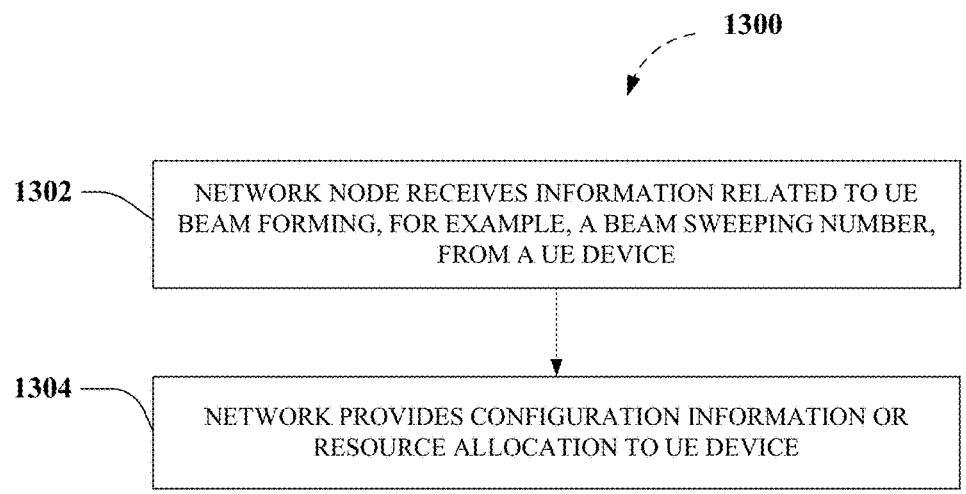
FIG. 13 illustrates another example methodology for providing information related to UE beamforming from a UE device to a network.

FIG. 13 illustrates another example methodology for providing information related to UE beamforming from a UE device to a network. At Step 1302 of the flow diagram 1300, a network node receives information related to UE beamforming from a UE device, including UE device's beam sweeping number. At Step 1304, the network node provides configuration information to the UE device or resource allocation information to the UE device, wherein the configuration or the resource is determined based on at least the information related to UE beamforming.

In one embodiment, the information related to UE beamforming and/or the configuration information is exchanged during the connection establishment procedure between the UE device and the network. In another embodiment, the information related to UE beamforming is provided during the random access procedure. In one embodiment, network provides the configuration information and/or the resource to the UE device to perform measurement. In one embodiment, the configuration information and/or the resource allocation information is related to a reference signal, for example, a BRS.

The methodologies discussed above in FIGS. 12 and 13 enable the UE device to perform efficient UE beamforming. In one implementation example for both methodologies, the information provided by the UE to the network comprises whether or not the UE tends to use UE beamforming. In another example, the information indicates that the UE tends to use UE beamforming. In another example, the information comprises whether or not the UE is currently using beamforming. In another example, the information indicates that the UE is currently using UE beamforming. In another example, the information comprises whether or not the UE is able to use UE beamforming. In another example, the information indicates that the UE is able to use UE beamforming.

In one implementation example for both methodologies, the beamforming information provided by the UE device to the network comprises whether or not the UE beam sweeping is required. In another example, the information indicates that the UE beam sweeping is required by the UE device. In another example, the information comprises the maximum number of beams that the UE can generate concurrently. In another example, the information comprises the total number of UE beams that are required to cover (all the) different directions of the UE device's transmissions and receptions.

In one implementation example, the beamforming information is provided by the UE device to the network by way of signaling that includes information about the UE's capability. In one example, the information is provided during a procedure of establishing the connection. In one example, the information is provided in a connection request message. In another example, the information is provided in a connection setup complete message. In another example, the information is provided by a preamble during the random access procedure. In one example, the information is indicated by a preamble sequence selected by the UE device. In one example, the information is indicated by a (time/frequency) resource used by the UE to transmit a preamble. In one example, the information is provided in a first UL transmission of the random access procedure, e.g. a message like Msg3 in LTE. In one example, the information is provided explicitly. In one example, the information is provided implicitly, e.g. derived from other information.

In one implementation example, the UE operates in connected mode. In one example, the network node is a central unit (CU). In another example, the network node is a distributed unit (DU). In another example, the network node is a TRP. In another example, the network node is a base station. In another embodiment, the network node is a 5G node. In another example, the resource is used for transmitting a signal in UL. In another example, the resource is used for transmitting a signal in DL. In one embodiment, the network provides the configuration information or the resource for the UE device to perform random access to the network. In another embodiment, the network provides the configuration information or the resource related to a discovery signal.

In one implementation example, the UE device is capable of using UE beamforming. In one embodiment, the UE requires the use of UE beam sweeping to perform UE beamforming. In one example, the UE uses UE beamforming to transmit a signal in a random access procedure, e.g. a preamble. In one example, the UE uses UE beamforming to monitor (or receive) a signal from a serving cell of the UE. In one example, the signal from the serving cell comprises synchronization signal. In another example, the signal comprises a reference signal. In another example, the signal comprises system information. In another example, the signal comprises paging (information). In one example, the synchronization signal is transmitted in downlink to facilitate cell search. In one example, the synchronization signal comprises one or multiple of the primary synchronization signal or the secondary synchronization signal. In one example, the reference signal is transmitted in downlink to deliver reference point for downlink power. In one example, the reference signal comprises one or multiple of the cell-specific reference signal, MBSFN reference signal, UE-specific reference signal, positioning reference signal, CSI reference signal, discovery signal, or beam specific reference signal.

In one example, the UE beam sweeping means that the UE generates a subset of beams in one time interval and change generated beam(s) in other time interval(s) in order to cover all possible directions for transmission and/or reception. In another example, the UE beam sweeping number is a necessary number of time interval(s) for the UE to sweep beams in all possible directions once for transmission and/or reception.

In an example implementation, the UE device comprising a control circuit, a processor installed in the control circuit and a memory installed in the control circuit and coupled to the processor. The processor is configured to execute a program code stored in the memory to perform the methodologies discussed above, including the methodologies described in FIGS. 10, 12 and 13.

Various embodiments of the subject disclosure described herein can be applied to or implemented in exemplary wireless communication systems and devices described below. In addition, various embodiments of the subject disclosure are described mainly in the context of the 3GPP architecture reference model. However, it is understood that with the disclosed information, one skilled in the art could easily adapt for use and implement aspects of the subject disclosure in a 3GPP2 network architecture as well as in other network architectures, as further described herein.

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A (Long Term Evolution Advanced) wireless access, 3GPP2 UMB (Ultra Mobile Broadband), WiMax, 3GPP NR (New Radio) wireless access for 5G, or some other modulation techniques.

Figure 15:
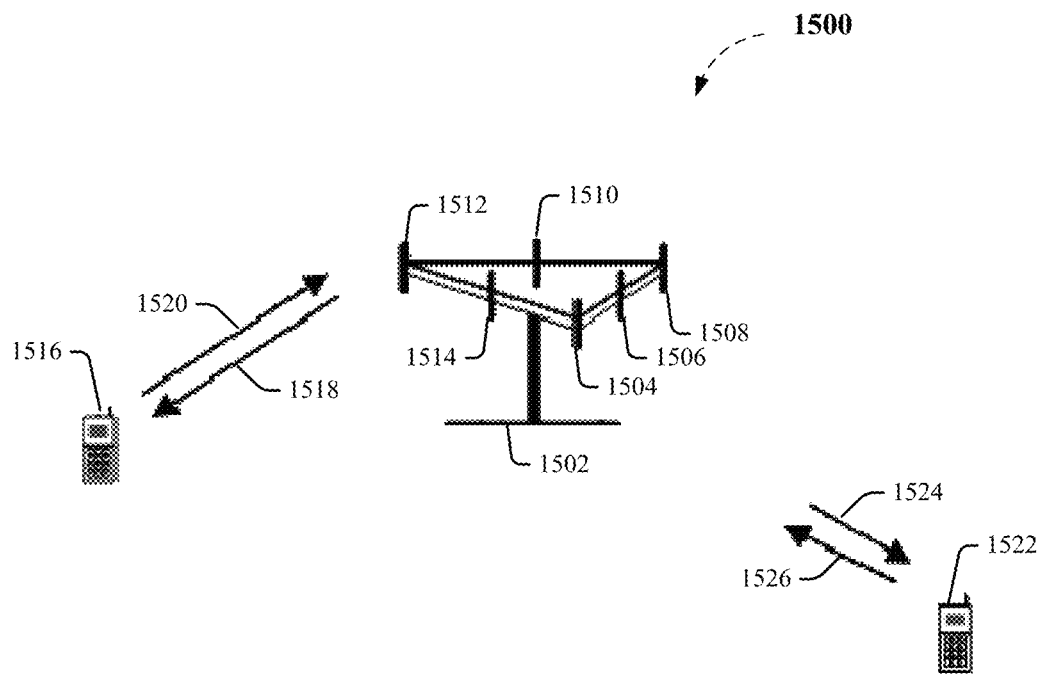
FIG. 15 illustrates and example multiple access wireless communication system in which various embodiments directed to concurrent UL transmissions and concurrent DL transmissions can be implemented.

FIG. 15 is a block diagram representing an exemplary non-limiting multiple access wireless communication system 1500 in which various embodiments described herein can be implemented. An access network 1502 (AN) includes multiple antenna groups, one group including antennas 1504 and 1506, another group including antennas 1508 and 1510, and an additional group including antennas 1512 and 1514. In FIG. 15, only two antennas are shown for each antenna group, however, more or fewer antennas may be utilized for each antenna group. Access terminal 1516 (AT) is in communication with antennas 1512 and 1514, where antennas 1512 and 1514 transmit information to access terminal 1516 over forward link 1518 and receive information from access terminal 1516 over reverse link 1520. Access terminal (AT) 1522 is in communication with antennas 1506 and 1508, where antennas 1506 and 1508 transmit information to access terminal (AT) 1522 over forward link 1524 and receive information from access terminal (AT) 1522 over reverse link 1526. In a Frequency Division Duplex (FDD) system, communication links 1518, 1520, 1524 and 1526 may use different frequency for communication. For example, forward link 1518 may use a different frequency than that used by reverse link 1520.

Each group of antennas and/or the area in which they are designed to communicate is often referred to as a sector of the access network. In non-limiting aspects, antenna groups each can be designed to communicate to access terminals in a sector of the areas covered by access network 1502.

In communication over forward links 1518 and 1524, the transmitting antennas of access network 1502 may utilize beamforming in order to improve the signal-to-noise ratio of forward links for the different access terminals 1516 and 1522. Also, an access network using beamforming to transmit to access terminals scattered randomly through its coverage normally causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an eNodeB, or some other terminology. An access terminal (AT) may also be called user equipment (UE), UE device, a communication device, a wireless communication device, a mobile device, a mobile communication device, a terminal, an access terminal or some other terminology.

Figure 16:
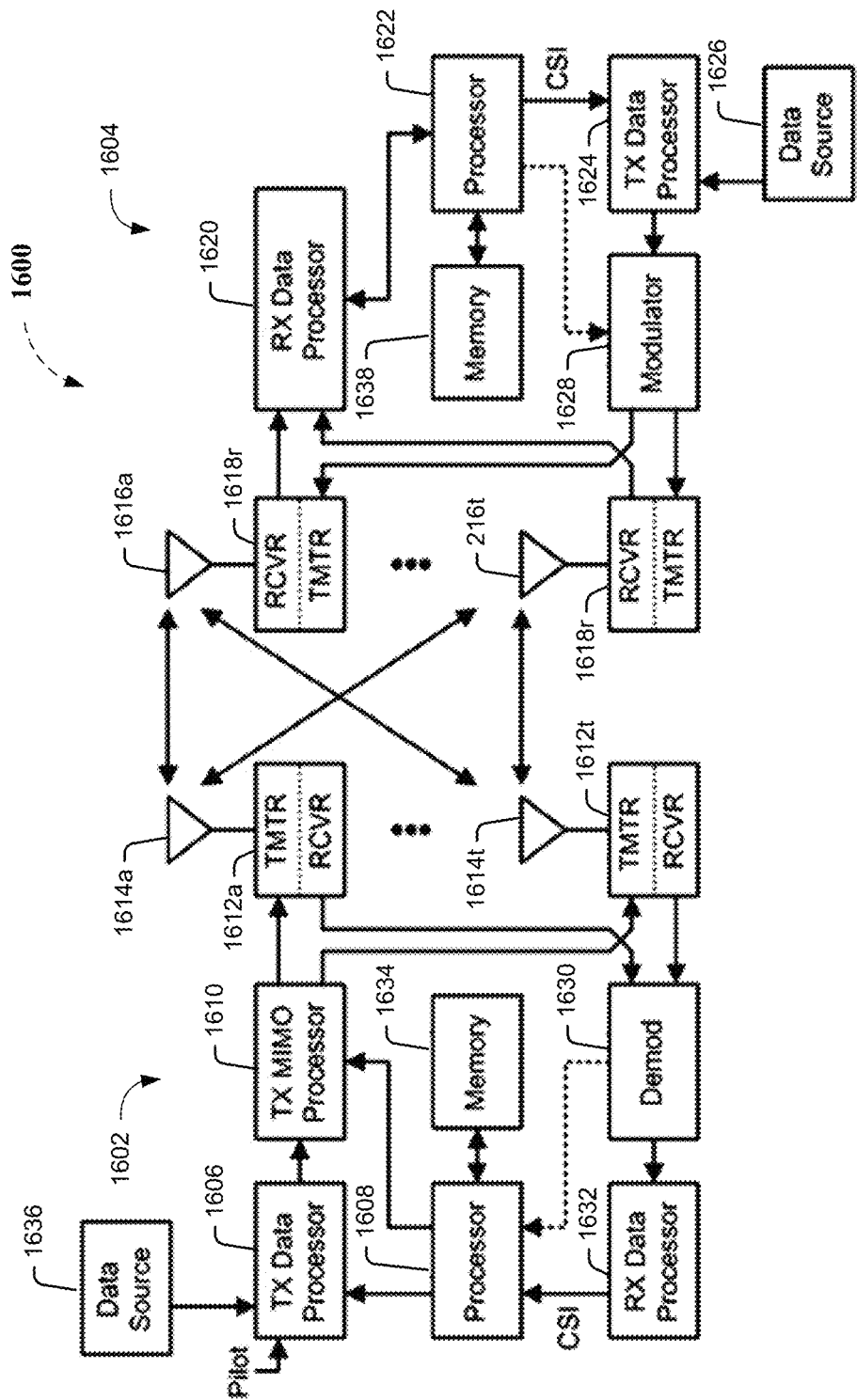
FIG. 16 illustrates a simplified block diagram of an example MIMO system depicting an example embodiment of a transmitter system (also referred to herein as an access network) and a receiver system (also referred to herein as an access terminal (AT) or user equipment (UE)), suitable for incorporation of various aspects directed to various networks, TRPs and UEs described herein.

FIG. 16 is a simplified block diagram of an exemplary non-limiting MIMO system 1600 depicting an exemplary embodiment of a transmitter system 1602 (also referred to herein as the access network) and a receiver system 1604 (also referred to herein as an access terminal (AT) or user equipment (UE)).

In a non-limiting aspect, each data stream can be transmitted over a respective transmit antenna. Exemplary TX data processor 1606 can format, code, and interleave the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system 1604 to estimate the channel response. The multiplexed pilot and coded data for each data stream is then modulated (e.g., symbol mapped) based on a particular modulation scheme (e.g., binary phase-shift keying (BPSK), quadrature phase shift keying (QPSK), M-ary or higher-order PSK (M-PSK), or M-ary quadrature amplitude modulation (M-QAM), etc.) selected for that data stream to provide modulation symbols. The data rate, coding, and modulation for each data stream may be determined by instructions performed by processor 1608.

The modulation symbols for all data streams are then provided to a TX MIMO processor 1610, which may further process the modulation symbols (e.g., for OFDM). TX MIMO processor 1610 then provides multiple (NT) modulation symbol streams to NT transmitters (TMTR) 1612a through 1612t. In certain embodiments, TX MIMO processor 1610 applies beamforming weights to the symbols of the data streams and to the antenna from which the symbol is being transmitted.

Each transmitter 1612 receives and processes a respective symbol stream to provide one or more analog signals, and further conditions (e.g., amplifies, filters, and upconverts, etc.) the analog signals to provide a modulated signal suitable for transmission over the MIMO channel. NT modulated signals from transmitters 1612a through 1612t are then transmitted from NT antennas 1614a through 1614t, respectively.

At receiver system 1604, the transmitted modulated signals are received by multiple (NR) antennas 1616a through 1616r and the received signal from each antenna 1616 is provided to a respective receiver (RCVR) 1618a through 1618r. Each receiver 1618 conditions (e.g., filters, amplifies, and downconverts, etc.) a respective received signal, digitizes the conditioned signal to provide samples, and further processes the samples to provide a corresponding "received" symbol stream.

A RX data processor 1620 then receives and processes the NR received symbol streams from NR receivers 1618 based on a particular receiver processing technique to provide NT "detected" symbol streams. The RX data processor 1620 then demodulates, deinterleaves, and decodes each detected symbol stream to recover the traffic data for the data stream. The processing by RX data processor 1620 is complementary to that performed by TX MIMO processor 1610 and TX data processor 1606 at transmitter system 1602.

A processor 1622 periodically determines which pre-coding matrix to use, for example, as further described herein. Processor 1622 formulates a reverse link message comprising a matrix index portion and a rank value portion.

The reverse link message may comprise various types of information regarding the communication link and/or the received data stream. The reverse link message is then processed by a TX data processor 1624, which also receives traffic data for a number of data streams from a data source 1626, modulated by a modulator 1628, conditioned by transmitters 1618a through 1618r, and transmitted back to transmitter system 1602.

At transmitter system 1602, the modulated signals from receiver system 1604 are received by antennas 1614, conditioned by receivers 1612, demodulated by a demodulator 1630, and processed by a RX data processor 1632 to extract the reserve link message transmitted by the receiver system 1604. Processor 1608 then determines which pre-coding matrix to use for determining the beamforming weights then processes the extracted message.

Memory 1634 may be used to temporarily store some buffered/computational data from 1630 or 1632 through Processor 1608, store some buffered data from data source 1636, or store some specific program codes, for example, as further described herein, for example, regarding FIGS. 10-13. Likewise, memory 1638 may be used to temporarily store some buffered/computational data from RX data processor 1620 through processor 1622, store some buffered data from data source 1626, or store some specific program codes, for example, as further described herein, for example, regarding FIGS. 10-13.

In view of the example embodiments described supra, devices and systems that can be implemented in accordance with the disclosed subject matter will be better appreciated with reference to the diagrams of FIGS. 10-13. While for purposes of simplicity of explanation, the example devices and systems are shown and described as a collection of blocks, it is to be understood and appreciated that the claimed subject matter is not limited by the order, arrangement, and/or number of the blocks, as some blocks may occur in different orders, arrangements, and/or combined and/or distributed with other blocks or functionality associated therewith from what is depicted and described herein. Moreover, not all illustrated blocks may be required to implement the example devices and systems described hereinafter. Additionally, it should be further understood that the example devices and systems and/or functionality disclosed hereinafter and throughout this specification are capable of being stored on an article of manufacture to facilitate transporting and transferring such methods to computers, for example, as further described herein. The terms computer readable medium, article of manufacture, and the like, as used herein, are intended to encompass a computer program product accessible from any computer-readable device or media such as a tangible computer readable storage medium.

It can be understood that various techniques described herein may be implemented in connection with hardware or software or, where appropriate, with a combination of both. As used herein, the terms "device," "component," "system" and the like are likewise intended to refer to a computer-related entity, either hardware, a combination of hardware and software, software, or software in execution. For example, a "device," "component," subcomponent, "system" portions thereof, and so on, may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

It can be further understood that while a brief overview of example systems, methods, scenarios, and/or devices has been provided, the disclosed subject matter is not so limited. Thus, it can be further understood that various modifications, alterations, addition, and/or deletions can be made without departing from the scope of the embodiments as described herein. Accordingly, similar non-limiting implementations can be used or modifications and additions can be made to the described embodiments for performing the same or equivalent function of the corresponding embodiments without deviating therefrom.

Figure 17:
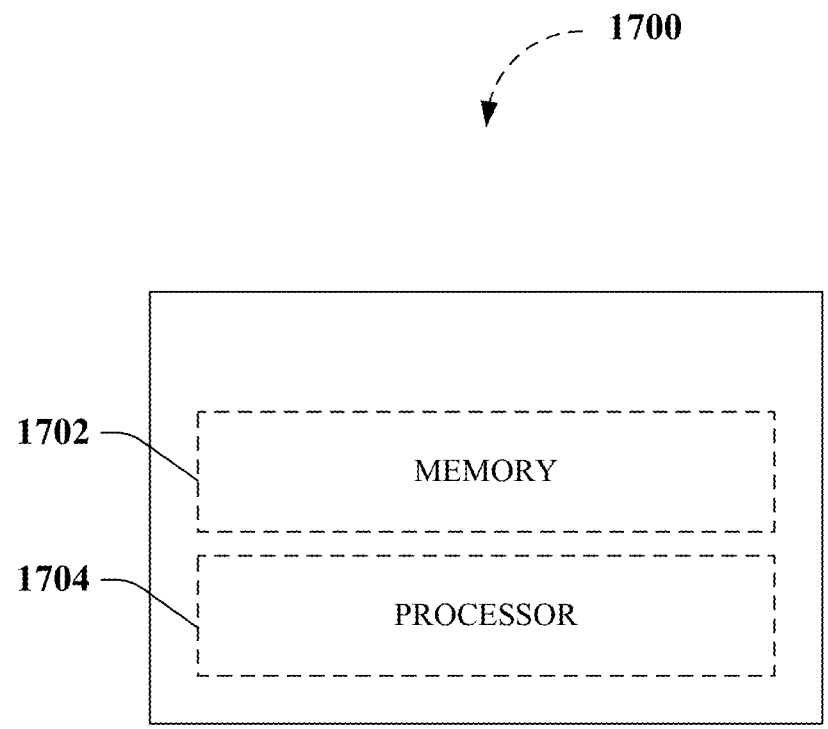
FIG. 17 depicts an example non-limiting device or system suitable for performing various aspects of the disclosed subject matter.

FIG. 17 illustrates an example non-limiting device or system 1700 suitable for performing various aspects of the disclosed subject matter. The device or system 1700 can be a stand-alone device or a portion thereof, a specially programmed computing device or a portion thereof (e.g., a memory retaining instructions for performing the techniques as described herein coupled to a processor), and/or a composite device or system comprising one or more cooperating components distributed among several devices, as further described herein. As an example, example non-limiting device or system 1700 can comprise example any of the devices and/or systems illustrated in FIGS. 1-16, as described above, or as further described below regarding FIGS. 18-20, for example, or portions thereof.

For example, FIG. 17 depicts an example device 1700, which can be the UE device 1516 or 1522. In another non-limiting example, FIG. 17 depicts an example device 1700, which can an access network 1502, eNB 110 or a TRP 120, 124 or 128. The device 1700 can be configured to perform the beamforming, beam sweeping, cell selection, cell measurement, cell evaluation and the connection between the UE device and a network, as illustrated in FIGS. 10-13 and related description. The device or system 1700 can comprise a memory 1702 that retains computer-executable instructions on a tangible computer readable storage medium and those instructions can be executed by the processor 1704. By way of the example, the UE 1700 can initiate a connection with a network, provide beamforming information to the network, including the UE's beam sweeping number, and receive and analyze the reference signals received from the network. The UE 1700 can perform beamforming, beam sweeping, cell measurement and evaluation, and cell selection. In an example in which the system 1700 represents the network, the network 1700 can receive communication from the UE device including the UE device's beamforming information (e.g. the UE device's beam sweeping number) and provide configuration information and resource allocation to the UE device to assist the UE device in efficiency of UE beamforming utilization.

Figure 18:
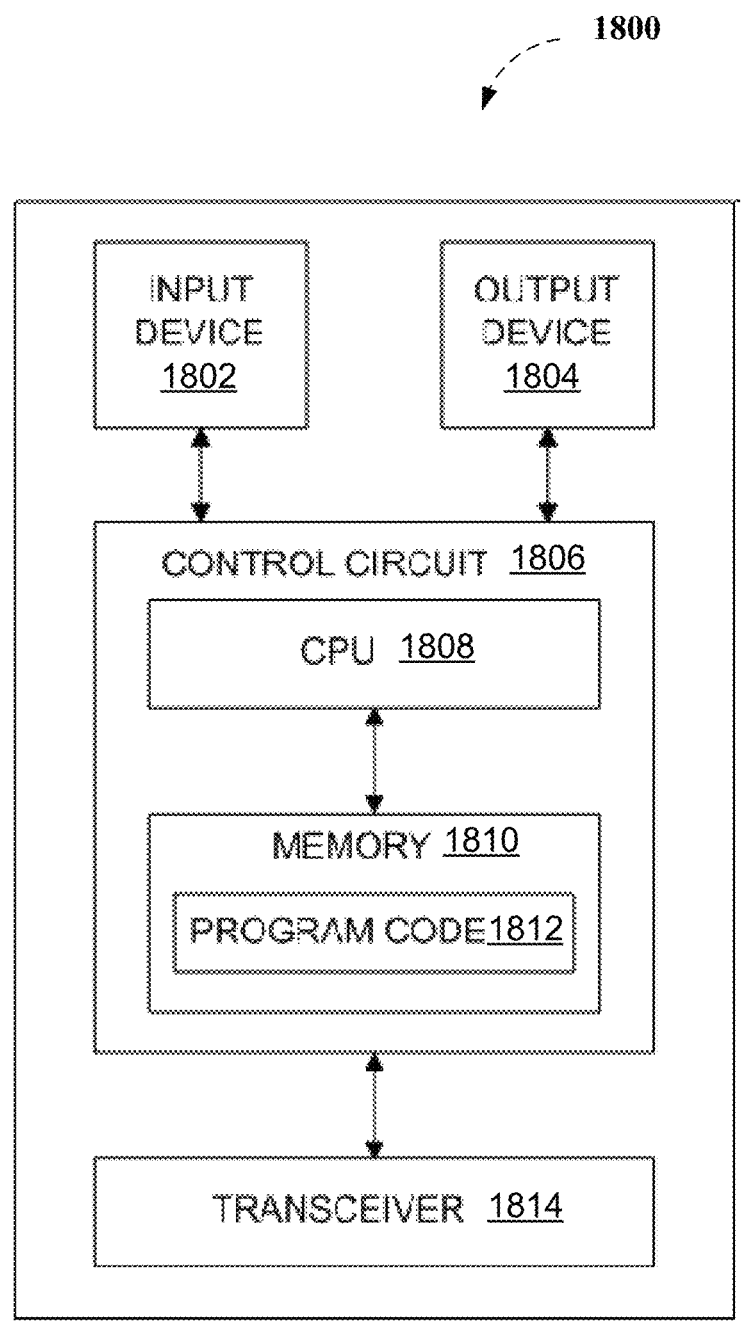
FIG. 18 depicts a simplified functional block diagram of an example non-limiting communication device suitable for incorporation of various aspects of the subject disclosure.

FIG. 18 depicts a simplified functional block diagram of an exemplary non-limiting communication device 1800, such as a UE device (e.g., UE device configured to perform beam management comprising AT 1516, AT 1522, receiver system 1604, or portions thereof, and/or as further described herein regarding FIGS. 12-18, etc.), a base station (e.g., a base station such as an access network 1502, a transmitter system 1502, and/or portions thereof, configured for beam handling, etc.), etc., suitable for incorporation of various aspects of the subject disclosure. As shown in FIG. 16, exemplary communication device 1600 in a wireless communication system can be utilized for realizing the UEs (or ATs) 1516 and 1522 in FIG. 15, for example, and the wireless communications system such as described above regarding FIG. 15, as a further example, can be the LTE system, the NR system, etc. Exemplary communication device 1800 can comprise an input device 1802, an output device 1804, a control circuit 1806, a central processing unit (CPU) 1808, a memory 1810, a program code 1812, and a transceiver 1814. Exemplary control circuit 1806 can execute the program code 1812 in the memory 1810 through the CPU 1808, thereby controlling an operation of the communications device 1800. Exemplary communications device 1800 can receive signals input by a user through the input device 1802, such as a keyboard or keypad, and can output images and sounds through the output device 1804, such as a monitor or speaker. Exemplary transceiver 1814 can be used to receive and transmit wireless signals, delivering received signals to the control circuit 1806, and outputting signals generated by the control circuit 1806 wirelessly, for example, as described above regarding FIG. 15.

Accordingly, further non-limiting embodiments as described herein can comprise a UE device (e.g., UE device configured for beam handling and comprising AT 1516, AT 1522, receiver system 1604, or portions thereof, and/or as further described herein regarding FIGS. 10-20, etc.) that can comprise one or more of a exemplary control circuit 1806, a processor (e.g., CPU 1808, etc.) installed in the control circuit (e.g., control circuit 1806), a memory (e.g., memory 1810) installed in the control circuit (e.g., control circuit 1806) and coupled to the processor (e.g., CPU 1808, etc.), wherein the processor (e.g., CPU 1808, etc.) is configured to execute a program code (e.g., program code 1812) stored in the memory (e.g., memory 1810) to perform method steps and/or provide functionality as described herein. As a non-limiting example, exemplary program code (e.g., program code 1812) can comprise computer-executable instructions as described above regarding FIG. 17, portions thereof, and/or complementary or supplementary instructions thereto, in addition to computer-executable instructions configured to achieve functionalities as described herein, regarding FIGS. 1-12, and/or any combinations thereof.

Figure 19:
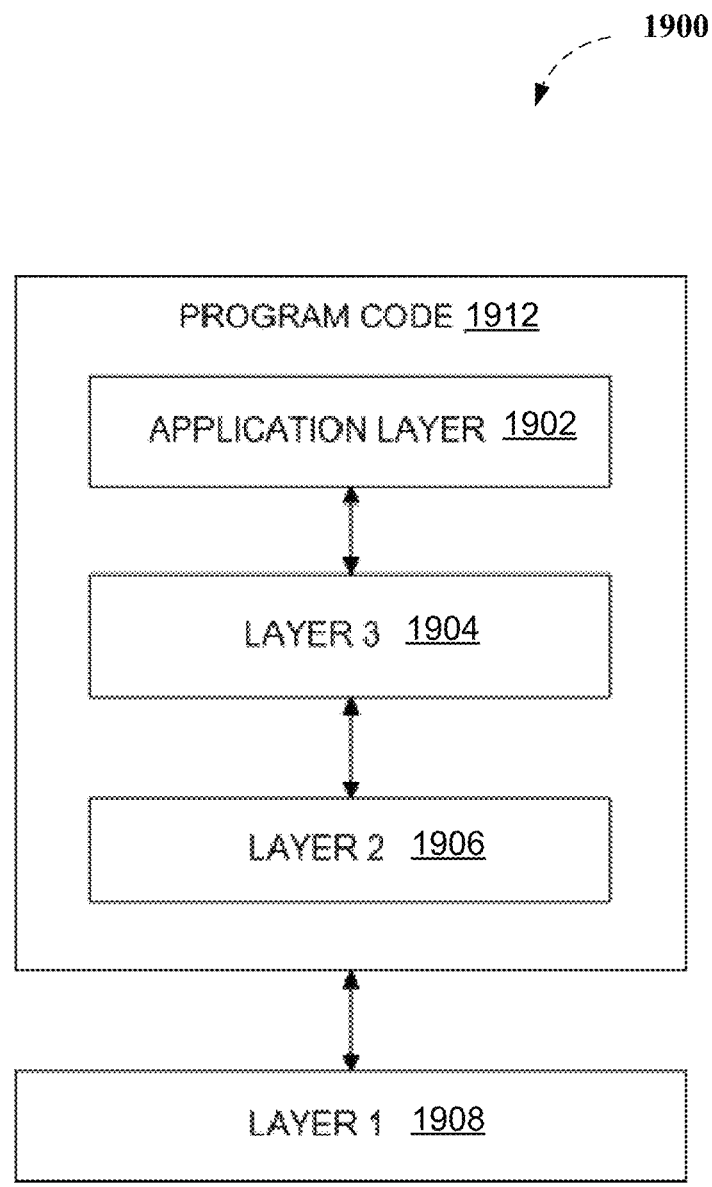
FIG. 19 depicts a simplified block diagram of example program code shown in FIGS. 10-13, suitable for incorporation of various aspects of the subject disclosure.

FIG. 19 depicts a simplified block diagram 1900 of exemplary program code 1812 shown in FIG. 18, suitable for incorporation of various aspects of the subject disclosure. In this embodiment, exemplary program code 1912 can comprise an application layer 1902, a Layer 3 portion 1904, and a Layer 2 portion 1906, and can be coupled to a Layer 1 portion 1908. The Layer 3 portion 1904 generally performs radio resource control. The Layer 2 portion 1906 generally performs link control. The Layer 1 portion 1908 generally performs physical connections. For LTE, LTE-A, or NR system, the Layer 2 portion 1906 may include a Radio Link Control (RLC) layer and a Medium Access Control (MAC) layer. The Layer 3 portion 1904 may include a Radio Resource Control (RRC) layer. In addition, as further described above, exemplary program code (e.g., program code 1912) can comprise computer-executable instructions as described above regarding FIG. 17, portions thereof, and/or complementary or supplementary instructions thereto, in addition to computer-executable instructions configured to achieve functionalities as described herein, regarding FIGS. 1-20, and/or any combinations thereof.

Figure 20:
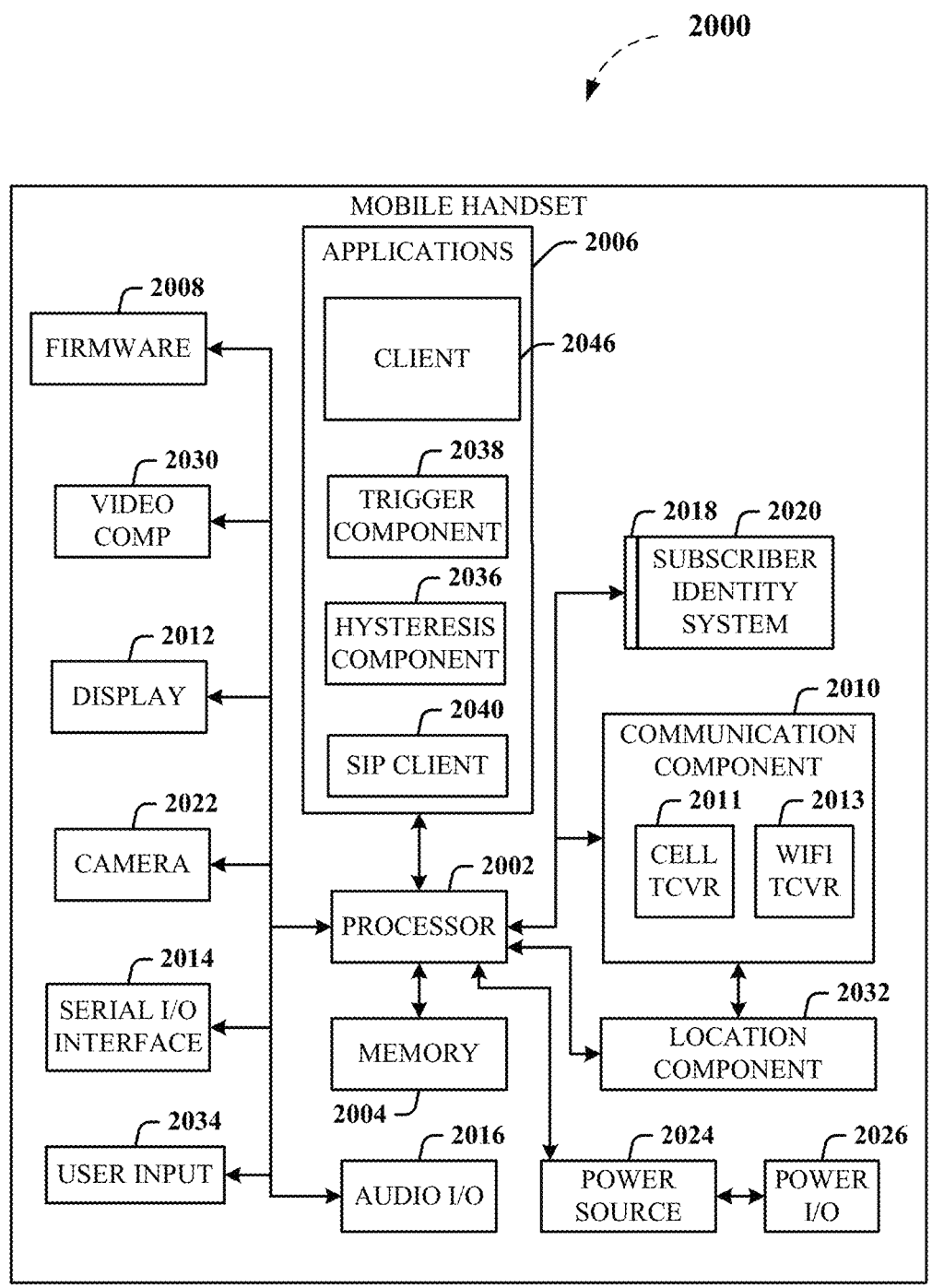
FIG. 20 illustrates a schematic diagram of an example mobile device (e.g. a mobile handset, user device, user equipment, or access terminal) that can facilitate various non-limiting aspects of the disclosed subject matter in accordance with the embodiments described herein.

FIG. 20 depicts a schematic diagram of an example mobile device 2000 (e.g., a mobile handset, UE, AT, etc.) that can facilitate various non-limiting aspects of the disclosed subject matter in accordance with the embodiments described herein. Although mobile handset 2000 is illustrated herein, it will be understood that other devices can be any of a number of other a mobile devices, for instance, and that the mobile handset 2000 is merely illustrated to provide context for the embodiments of the subject matter described herein. The following discussion is intended to provide a brief, general description of an example of a suitable environment 2000 in which the various embodiments can be implemented. While the description includes a general context of computer-executable instructions embodied on a tangible computer readable storage medium, those skilled in the art will recognize that the subject matter also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of computer readable media. Computer readable media can comprise any available media that can be accessed by the computer and includes both volatile and non-volatile media, removable and non-removable media. By way of example and not limitation, computer readable media can comprise tangible computer readable storage and/or communication media. Tangible computer readable storage can include volatile and/or non-volatile media, removable and/or non-removable media implemented in any method or technology for storage of information, such as computer readable instructions, data structures, program modules, or other data. Tangible computer readable storage can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media, as contrasted with tangible computer readable storage, typically embodies computer readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal, for example, as further described herein. By way of example, and not limitation, communication media includes wired media such as a wired network or direct-wired connection, and wireless media such as acoustic, RF, infrared and other wireless media. Combinations of the any of the above should also be included within the scope of computer readable communications media as distinguishable from computer-readable storage media.

The handset 2000 can include a processor 2002 for controlling and processing all onboard operations and functions. A memory 2004 interfaces to the processor 2002 for storage of data and one or more applications 2006 (e.g., communications applications such as browsers, apps, etc.). Other applications can support operation of communications and/or financial communications protocols. The applications 2006 can be stored in the memory 2004 and/or in a firmware 2008, and executed by the processor 2002 from either or both the memory 2004 or/and the firmware 2008. The firmware 2008 can also store startup code for execution in initializing the handset 2000. A communications component 2010 interfaces to the processor 2002 to facilitate wired/wireless communication with external systems, e.g., cellular networks, VoIP networks, and so on. Here, the communications component 2010 can also include a suitable cellular transceiver 2011 (e.g., a GSM transceiver, a CDMA transceiver, an LTE transceiver, etc.) and/or an unlicensed transceiver 2013 (e.g., Wireless Fidelity (WiFi™), Worldwide Interoperability for Microwave Access (WiMax®)) for corresponding signal communications, and the like. The handset 2000 can be a device such as a cellular telephone, a personal digital assistant (PDA) with mobile communications capabilities, and messaging-centric devices. The communications component 2010 also facilitates communications reception from terrestrial radio networks (e.g., broadcast), digital satellite radio networks, and Internet-based radio services networks, and so on.

The handset 2000 includes a display 2012 for displaying text, images, video, telephony functions (e.g., a Caller ID function, etc.), setup functions, and for user input. For example, the display 2012 can also be referred to as a "screen" that can accommodate the presentation of multimedia content (e.g., music metadata, messages, wallpaper, graphics, etc.). The display 2012 can also display videos and can facilitate the generation, editing and sharing of video quotes. A serial I/O interface 2014 is provided in communication with the processor 2002 to facilitate wired and/or wireless serial communications (e.g., Universal Serial Bus (USB), and/or Institute of Electrical and Electronics Engineers (IEEE) 1494) through a hardwire connection, and other serial input devices (e.g., a keyboard, keypad, and mouse). This supports updating and troubleshooting the handset 2000, for example. Audio capabilities are provided with an audio I/O component 2016, which can include a speaker for the output of audio signals related to, for example, indication that the user pressed the proper key or key combination to initiate the user feedback signal. The audio I/O component 2016 also facilitates the input of audio signals through a microphone to record data and/or telephony voice data, and for inputting voice signals for telephone conversations.

The handset 2000 can include a slot interface 2018 for accommodating a SIC (Subscriber Identity Component) in the form factor of a card Subscriber Identity Module (SIM) or universal SIM 2020, and interfacing the SIM card 2020 with the processor 2002. However, it is to be appreciated that the SIM card 2020 can be manufactured into the handset 2000, and updated by downloading data and software.

The handset 2000 can process Internet Protocol (IP) data traffic through the communication component 2010 to accommodate IP traffic from an IP network such as, for example, the Internet, a corporate intranet, a home network, a person area network, a cellular network, etc., through an internet service provider (ISP) or broadband cable provider. Thus, VoIP traffic can be utilized by the handset 2000 and IP-based multimedia content can be received in either an encoded or a decoded format.

A video processing component 2022 (e.g., a camera and/or associated hardware, software, etc.) can be provided for decoding encoded multimedia content. The video processing component 2022 can aid in facilitating the generation and/or sharing of video. The handset 2000 also includes a power source 2024 in the form of batteries and/or an alternating current (AC) power subsystem, which power source 2024 can interface to an external power system or charging equipment (not shown) by a power input/output (I/O) component 2026.

The handset 1800 can also include a video component 2030 for processing video content received and, for recording and transmitting video content. For example, the video component 2030 can facilitate the generation, editing and sharing of video. A location-tracking component 2032 facilitates geographically locating the handset 2000. A user input component 2034 facilitates the user inputting data and/or making selections as previously described. The user input component 2034 can also facilitate selecting respective recipients for fund transfer, entering amounts requested to be transferred, indicating account restrictions and/or limitations, as well as composing messages and other user input tasks as required by the context. The user input component

2034 can include such conventional input device technologies such as a keypad, keyboard, mouse, stylus pen, and/or touch screen, for example.

Referring again to the applications 2006, a hysteresis component 2036 facilitates the analysis and processing of hysteresis data, which is utilized to determine when to associate with an access point. A software trigger component 2038 can be provided that facilitates triggering of the hysteresis component 2036 when a WiFi™ transceiver 1813 detects the beacon of the access point. A Session Initiation Protocol (SIP) client 2040 enables the handset 2000 to support SIP protocols and register the subscriber with the SIP registrar server. The applications 1806 can also include a communications application or client 2046 that, among other possibilities, can facilitate user interface component functionality as described above.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code or program code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the various embodiments of the subject disclosure have been described in connection with various non-limiting aspects, it will be understood that the embodiments of the subject disclosure may be capable of further modifications. This application is intended to cover any variations, uses or adaptation of the subject disclosure following, in general, the principles of the subject disclosure, and including such departures from the present disclosure as come within the known and customary practice within the art to which the subject disclosure pertains.

Those skilled in the art will recognize that it is common within the art to describe devices and/or processes in the fashion set forth herein, and thereafter use engineering practices to integrate such described devices and/or processes into systems. That is, at least a portion of the devices and/or processes described herein can be integrated into a system via a reasonable amount of experimentation. Those having skill in the art will recognize that a typical system can include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control device (e.g., feedback for sensing position and/or velocity; control devices for moving and/or adjusting parameters). A typical system can be implemented utilizing any suitable commercially available components, such as those typically found in data computing/communication and/or network computing/communication systems.

Various embodiments of the disclosed subject matter sometimes illustrate different components contained within, or connected with, other components. It is to be understood that such depicted architectures are merely exemplary, and that, in fact, many other architectures can be implemented which achieve the same and/or equivalent functionality. In a conceptual sense, any arrangement of components to achieve the same and/or equivalent functionality is effectively "associated" such that the desired functionality is achieved. Hence, any two components herein combined to achieve a particular functionality can be seen as "associated with" each other such that the desired functionality is achieved, irrespective of architectures or intermediary components. Likewise, any two components so associated can also be viewed as being "operably connected," "operably coupled," "communicatively connected," and/or "communicatively coupled," to each other to achieve the desired functionality, and any two components capable of being so associated can also be viewed as being "operably couplable" or "communicatively couplable" to each other to achieve the desired functionality. Specific examples of operably couplable or communicatively couplable can include, but are not limited to, physically mateable and/or physically interacting components, wirelessly interactable and/or wirelessly interacting components, and/or logically interacting and/or logically interactable components.

With respect to substantially any plural and/or singular terms used herein, those having skill in the art can translate from the plural to the singular and/or from the singular to the plural as can be appropriate to the context and/or application. The various singular/plural permutations may be expressly set forth herein for the sake of clarity, without limitation.

It will be understood by those skilled in the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes, but is not limited to," etc.). It will be further understood by those skilled in the art that, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limit any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include, but not be limited to, systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those skilled in the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into sub-ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be noted that various embodiments of the disclosed subject matter have been described herein for purposes of illustration, and that various modifications may be made without departing from the scope and spirit of the subject disclosure. Accordingly, the various embodiments disclosed herein are not intended to be limiting, with the true scope and spirit being indicated by the appended claims.

In addition, the words "example" and "non-limiting" are used herein to mean serving as an example, instance, or illustration. For the avoidance of doubt, the subject matter disclosed herein is not limited by such examples. Moreover, any aspect or design described herein as "an example," "an illustration," "example" and/or "non-limiting" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements, as described above.

As mentioned, the various techniques described herein can be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on computer and the computer can be a component. In addition, one or more components can reside within a process and/or thread of execution and a component can be localized on one computer and/or distributed between two or more computers.

Systems described herein can be described with respect to interaction between several components. It can be understood that such systems and components can include those components or specified sub-components, some of the specified components or sub-components, or portions thereof, and/or additional components, and various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and that any one or more middle component layers, such as a management layer, can be provided to communicatively couple to such sub-components in order to provide integrated functionality, as mentioned. Any components described herein can also interact with one or more other components not specifically described herein but generally known by those of skill in the art.

As mentioned, in view of the example systems described herein, methods that can be implemented in accordance with the described subject matter can be better appreciated with reference to the flowcharts of the various figures and vice versa. While for purposes of simplicity of explanation, the methods can be shown and described as a series of blocks, it is to be understood and appreciated that the claimed subject matter is not limited by the order of the blocks, as some blocks can occur in different orders and/or concurrently with other blocks from what is depicted and described herein. Where non-sequential, or branched, flow is illustrated via flowchart, it can be understood that various other branches, flow paths, and orders of the blocks, can be implemented which achieve the same or a similar result. Moreover, not all illustrated blocks can be required to implement the methods described hereinafter.

While the disclosed subject matter has been described in connection with the disclosed embodiments and the various figures, it is to be understood that other similar embodiments may be used or modifications and additions may be made to the described embodiments for performing the same function of the disclosed subject matter without deviating therefrom. Still further, multiple processing chips or multiple devices can share the performance of one or more functions described herein, and similarly, storage can be effected across a plurality of devices. In other instances, variations of process parameters (e.g., configuration, number of components, aggregation of components, process step timing and order, addition and/or deletion of process steps, addition of preprocessing and/or post-processing steps, etc.) can be made to further optimize the provided structures, devices and methods, as shown and described herein. In any event, the systems, structures and/or devices, as well as the associated methods described herein have many applications in various aspects of the disclosed subject matter, and so on. Accordingly, the subject disclosure should not be limited to any single embodiment, but rather should be construed in breadth, spirit and scope in accordance with the appended claims.

What is claimed is:

1. A method for a user equipment (UE), comprising:
providing information related to UE beamforming to a network node, wherein the information comprises a UE beam sweeping number for the network node to provide configuration information or allocate a resource to the UE and wherein the UE beam sweeping number is a necessary number of time interval(s) for the UE to sweep beams in all possible directions once for transmission;
receiving the configuration information or an allocation of the resource from the network node; and
performing the UE beam sweeping to transmit an uplink reference signal based on the configuration information or the resource.

2. The method of claim 1, wherein the UE can generate more than one beam concurrently.

3. The method of claim 1, wherein the UE beam sweeping comprises the UE generating a subset of beams in one time interval and changing generated beam(s) in other time interval(s) in order to cover all possible directions for transmission.

4. A method for a network node, comprising:
receiving information related to UE beamforming from a UE, wherein the information comprises a UE beam sweeping number and wherein the UE beam sweeping number is a necessary number of time interval(s) for the UE to sweep beams in all possible directions once for transmission; and
providing configuration information or allocating a resource to the UE, wherein the configuration information or the resource is used for uplink reference signal transmission and is determined based on at least the information received from the UE.

5. The method of claim 4, wherein the UE can generate more than one beam concurrently.

6. The method of claim 4, wherein the UE beam sweeping is the UE generating a subset of beams in one time interval and changing generated beam(s) in other time interval(s) in order to cover all possible directions for transmission.

7. A user equipment (UE) device, comprising:
a control circuit;
a processor installed in the control circuit; and
a memory installed in the control circuit and operatively coupled to the processor, wherein the processor is configured to execute a program code stored in the memory to perform operations comprising:
providing information related to UE beamforming to a network node, wherein the information comprises a UE beam sweeping number for the network node to provide configuration information or allocate a resource to the UE and wherein the UE beam sweeping number is a necessary number of time interval(s) for the UE to sweep beams in all possible directions once for transmission;
receiving the configuration information or an allocation of the resource from the network node; and
performing the UE beam sweeping to transmit an uplink reference signal based on the configuration information or the resource.

8. The UE device of 7, wherein the UE can generate more than one beam concurrently.

9. The UE device of claim 7, wherein the UE beam sweeping is the UE generating a subset of beams in one time interval and changing generated beam(s) in other time interval(s) in order to cover all possible directions for transmission.

10. A network device, comprising:
a control circuit;
a processor installed in the control circuit; and
a memory installed in the control circuit and operatively coupled to the processor, wherein the processor is configured to execute a program code stored in the memory to perform operations comprising:
receiving information related to UE beamforming from a UE, wherein the information comprises a UE beam sweeping number and wherein the UE beam sweeping number is a necessary number of time interval(s) for the UE to sweep beams in all possible directions once for transmission; and
providing configuration information or allocating a resource to the UE, wherein the configuration information or the resource is used for uplink reference signal transmission and is determined based on at least the information received from the UE.

11. The network device of claim 10, the UE can generate more than one beam concurrently.

12. The network device of claim 10, wherein the UE beam sweeping is the UE generating a subset of beams in one time interval and changing generated beam(s) in other time interval(s) in order to cover all possible directions for transmission.

13. A method for a network node, comprising:
receiving information related to UE beamforming from a UE, wherein the information comprises a UE beam sweeping number and wherein the UE beam sweeping number is a necessary number of time interval(s) for the UE to sweep beams in all possible directions once for reception;
providing configuration information or allocating a resource to the UE, wherein the configuration information or the resource is used for downlink reference signal transmission and is determined based on at least the information received from the UE; and
transmitting downlink reference signals for a number of times based on the configuration information or the resource, wherein the number of times is determined based on the UE beam sweeping number.

14. The method of claim 13, wherein the number of times for downlink reference signal transmissions during a period is the same as the UE beam sweeping number.

15. The method of claim 13, wherein the downlink reference signal is a channel state information reference signal.

16. The method of claim 13, wherein the UE beam sweeping is the UE generating a subset of beams in one time interval and changing generated beam(s) in other time interval(s) in order to cover all possible directions for reception.

17. A network device, comprising:
a control circuit;
a processor installed in the control circuit; and
a memory installed in the control circuit and operatively coupled to the processor, wherein the processor is configured to execute a program code stored in the memory to perform operations comprising:
receiving information related to UE beamforming from a UE, wherein the information comprises a UE beam sweeping number and wherein the UE beam sweeping number is a necessary number of time interval(s) for the UE to sweep beams in all possible directions once for reception;
providing configuration information or allocating a resource to the UE, wherein the configuration information or the resource is used for downlink reference signal transmission and is determined based on at least the information received from the UE; and
transmitting downlink reference signals for a number of times based on the configuration information or the resource, wherein the number of times is determined based on the UE beam sweeping number.

18. The network device of claim 17, wherein the number of times for downlink reference signal transmissions during a period is the same as the UE beam sweeping number.

19. The network device of claim 17, wherein the downlink reference signal is a channel state information reference signal.

20. The network device of claim 17, wherein the UE beam sweeping is the UE generating a subset of beams in one time interval and changing generated beam(s) in other time interval(s) in order to cover all possible directions for reception.

* * * * *